US012014680B2

(12) United States Patent
Pyun et al.

(10) Patent No.: US 12,014,680 B2
(45) Date of Patent: Jun. 18, 2024

(54) DISPLAY DEVICE AND DRIVING METHOD THEREOF

(71) Applicant: Samsung Display Co., Ltd., Yongin-si (KR)

(72) Inventors: Kihyun Pyun, Gwangmyeong-si (KR); Hyunjoo Seo, Changwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/111,234

(22) Filed: Feb. 17, 2023

(65) Prior Publication Data

US 2023/0290303 A1 Sep. 14, 2023

(30) Foreign Application Priority Data

Mar. 11, 2022 (KR) ........................ 10-2022-0030655

(51) Int. Cl.
*G09G 3/3225* (2016.01)

(52) U.S. Cl.
CPC ... *G09G 3/3225* (2013.01); *G09G 2300/0828* (2013.01); *G09G 2320/0626* (2013.01); *G09G 2330/028* (2013.01)

(58) Field of Classification Search
CPC ......... G09G 3/3225; G09G 2300/0828; G09G 2320/0626; G09G 2330/028; G09G 2300/0819; G09G 2300/0842; G09G 2300/0861; G09G 2320/029; G09G 2320/0686; G09G 2330/021; G09G 3/2092; G09G 3/006; G09G 3/3233; G01R 19/16528; G01R 19/25; G01R 19/30
See application file for complete search history.

(56) References Cited

U.S. PATENT DOCUMENTS

| | | | |
|---|---|---|---|
| 9,234,770 B2 | 1/2016 | Kulik et al. | |
| 9,633,601 B2 | 4/2017 | Cheon et al. | |
| 10,002,554 B2 * | 6/2018 | Bae | G09G 3/20 |

(Continued)

FOREIGN PATENT DOCUMENTS

| | | |
|---|---|---|
| KR | 101436227 B1 | 9/2014 |
| KR | 1020160028621 A | 3/2016 |

(Continued)

*Primary Examiner* — Mihir K Rayan
(74) *Attorney, Agent, or Firm* — CANTOR COLBURN LLP

(57) ABSTRACT

A display device includes a display panel which is driven in a mode selected from among a plurality of modes including different luminance values, a voltage generator which generates a driving voltage, a resistor connected to an output terminal, from which the driving voltage is output, a current sensing unit connected in parallel to the resistor, where the current sensing unit measures a voltage value across both ends of the resistor and calculates a driving current value using a resistance value of the resistor and a measured voltage value, and a maximum current calculating unit which calculates a maximum measured current value corresponding a the luminance value of a selected mode and outputs a selection signal corresponding to the maximum measured current value, and the current sensing unit sets a maximum measured voltage value corresponding to the maximum measured current value in response to the selection signal.

20 Claims, 16 Drawing Sheets

(56) References Cited

U.S. PATENT DOCUMENTS

| | | | | |
|---|---|---|---|---|
| 11,030,954 | B2 * | 6/2021 | Choi | G09G 3/3258 |
| 2008/0024526 | A1 * | 1/2008 | Ko | G09G 3/3233 345/82 |
| 2009/0109147 | A1 * | 4/2009 | Park | G09G 3/3233 345/76 |
| 2011/0257936 | A1 * | 10/2011 | Kulik | G01D 3/024 702/189 |
| 2015/0243218 | A1 * | 8/2015 | Tseng | G09G 3/3258 345/212 |
| 2016/0063925 | A1 * | 3/2016 | Bae | G09G 3/32 345/691 |
| 2016/0155382 | A1 * | 6/2016 | Cheon | G09G 3/3258 345/76 |
| 2023/0351963 | A1 * | 11/2023 | Pyun | G09G 3/3233 |

FOREIGN PATENT DOCUMENTS

| | | | |
|---|---|---|---|
| KR | 1020200067473 | A | 6/2020 |
| KR | 102218642 | B1 | 2/2021 |

* cited by examiner

FIG. 11

| Mode | SS(4bits) | | | | Vmax | Imax (Rv=4mΩ) | Current Resolution (ADC=15bits) | Operation |
|---|---|---|---|---|---|---|---|---|
| MD1 | Off (0) | Off (0) | Off (0) | Off (0) | 20mV (Vr1) | 5A | 0.15mA | Vmax → 20mV<br>Imax → 5A |
| MD2 | On (1) | Off (0) | Off (0) | Off (0) | 40mV (Vr2) | 10A | 0.31mA | Vmax → 40mV<br>Imax → 10A |
| MD3 | On (1) | On (1) | Off (0) | Off (0) | 80mV (Vr3) | 20A | 0.62mA | Vmax → 80mV<br>Imax → 20A |
| MD4 | On (1) | On (1) | On (1) | Off (0) | 120mV (Vr4) | 30A | 0.92mA | Vmax → 120mV<br>Imax → 30A |
| MD5 | On (1) | On (1) | On (1) | On (1) | 160mV (Vr5) | 40A | 1.2mA | Vmax → 160mV<br>Imax → 40A |

FIG. 14

| Mode | SS(4bits) | | | | Rv' | Imax (Vmax=160mV) | Current Resolution (ADC=15bits) |
|---|---|---|---|---|---|---|---|
| | B0 | B1 | B2 | B3 | | | |
| MD1 | Off (0) | Off (0) | Off (0) | Off (0) | 32mΩ | 5A | 0.15mA |
| MD2 | On (1) | Off (0) | Off (0) | Off (0) | 16mΩ | 10A | 0.31mA |
| MD3 | On (1) | On (1) | Off (0) | Off (0) | 8mΩ | 20A | 0.62mA |
| MD4 | On (1) | On (1) | On (1) | Off (0) | 5.33mΩ | 30A | 0.92mA |
| MD5 | On (1) | On (1) | On (1) | On (1) | 4mΩ | 40A | 1.2mA |

DISPLAY DEVICE AND DRIVING METHOD THEREOF

This application claims priority to Korean Patent Application No. 10-2022-0030655, filed on Mar. 11, 2022, and all the benefits accruing therefrom under 35 U.S.C. § 119, the content of which in its entirety is herein incorporated by reference.

BACKGROUND

1. Field

Embodiments of the disclosure described herein relate to a display device and a driving method thereof.

2. Description of the Related Art

In general, electronic devices such as smart phones, digital cameras, notebook computers, navigation systems, smart televisions, and the like that provide images to users include display devices for displaying images. Such a display device generates an image and then provides the user with the generated image through a display screen thereof.

The display device typically includes a plurality of pixels for generating an image, a scan driver applying scan signals to the pixels, a data driver applying data voltages to the pixels, and a voltage generator applying a driving voltage to the pixels. The pixels receive data voltages in response to the scan signals, and generate an image using the data voltages and the driving voltage.

A current measuring unit may be connected to an output terminal of the voltage generator that outputs the driving voltage, and the current measuring unit may measure a current being provided to the display panel. A current supplied to the display panel may be controlled using the measured current value. For example, when there is an overcurrent flowing through the display panel, the current provided to the display panel may be reduced depending on the measured current value.

SUMMARY

Embodiments of the disclosure provide a display device capable of variously setting a current resolution of a current sensing unit depending on modes of driving a display panel, and a driving method thereof.

According to an embodiment of the disclosure, a display device includes a display panel which is driven in a mode selected from among a plurality of modes including different luminance values, respectively, a voltage generator which generates a driving voltage, a resistor connected to an output terminal of the voltage generator from which the driving voltage is output, a current sensing unit connected in parallel to the resistor, where the current sensing unit measures a voltage value across both ends of the resistor and calculates a driving current value using a resistance value of the resistor and a measured voltage value, and a maximum current calculating unit which calculates a maximum measured current value corresponding to a luminance value of a selected mode and outputs a selection signal corresponding to the maximum measured current value, where the current sensing unit sets a maximum measured voltage value corresponding to the maximum measured current value in response to the selection signal.

According to an embodiment of the disclosure, a display device includes a display panel which is driven in a mode selected from among a plurality of modes including different luminance values, respectively, a voltage generator which generates a driving voltage, a sensing resistor unit connected to an output terminal of the voltage generator from which the driving voltage is output, where a resistance value of the sensing resistor unit is variable, a current sensing unit which measures a voltage value across both ends of the sensing resistor unit and calculates a driving current value using the resistance value and a measured voltage value, and a maximum current calculating unit which calculates a maximum measured current value corresponding to a luminance value of a selected mode and outputs a selection signal corresponding to the maximum measured current value, where the sensing resistor unit, in response to the selection signal, sets the resistance value thereof to a resistance value corresponding to the maximum measured current value.

According to an embodiment of the disclosure, a method of driving a display device includes generating a driving voltage to provide the driving voltage to a display panel of the display device, driving the display panel in a mode selected from among a plurality of modes including different luminance values, respectively, calculating a maximum measured current value corresponding to a luminance value of a selected mode, and outputting a selection signal corresponding to the maximum measured current value, measuring a voltage value across both ends of a sensing resistor unit connected to an output terminal from which the driving voltage is output, changing one of a maximum measured voltage value and a resistance value of the sensing resistor unit, based on the selection signal, and calculating a driving current value by dividing a measured voltage value by the resistance value of the sensing resistor unit.

BRIEF DESCRIPTION OF THE DRAWINGS

The above and other features of embodiments of the disclosure will become apparent by describing in detail embodiments thereof with reference to the accompanying drawings.

FIG. 11 is a diagram illustrating values of a selection signal, a maximum measured voltage, a maximum measured current, and a current resolution, which are set according to modes.

FIG. 14 is a diagram illustrating values of a selection signal, a resistance, a maximum measured current, and a current resolution, which are set according to modes.

DETAILED DESCRIPTION

Figure 1:
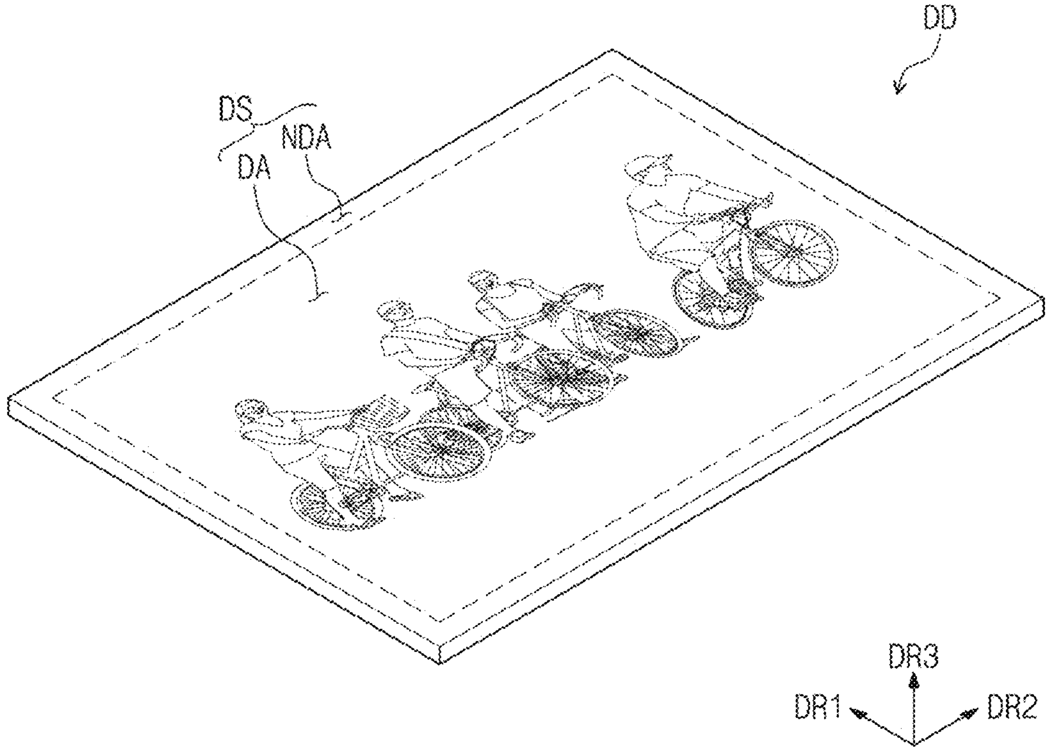
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms "first", "second", etc. are used to describe various components, but the components are not limited by the terms. The terms are used only to differentiate one component from another component. For example, a first component may be named as a second component, and vice versa, without departing from the spirit or scope of the disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the disclosure.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a perspective view of a display device according to an embodiment of the disclosure.

Referring to FIG. 1, an embodiment of a display device DD may have a surface or plane defined by first and second directions DR1 and DR2. The display device DD may have a rectangular shape including short sides extending in the first direction DR1 and long sides extending in the second direction DR2. However, the disclosure is not limited thereto, and alternatively, the display device DD may have various shapes, such as a circular shape or a polygonal shape.

The upper surface of the display device DD may be defined as a display surface DS and may be on a plane defined by the first direction DR1 and the second direction DR2. An image generated by the display device DD may be provided to a user through the display surface DS.

The display surface DS may include a display area DA and a non-display area NDA around the display area DA. The display area DA may display an image, and the non-display area NDA may not display an image. The non-display area NDA may surround the display area DA and may define a border of the display device DD, which may be printed in a specified color.

The display device DD may be used in large electronic devices such as a television, a monitor, or an external billboard. In addition, the display device DD may be used in small and medium-sized electronic devices such as a personal computer, a notebook computer, a personal digital terminal, a car navigation system, a game console, a smart phone, a tablet, or a camera. However, these are presented as an embodiment only, and may be used in other electronic devices without departing from the concept of the disclosure.

Figure 2:
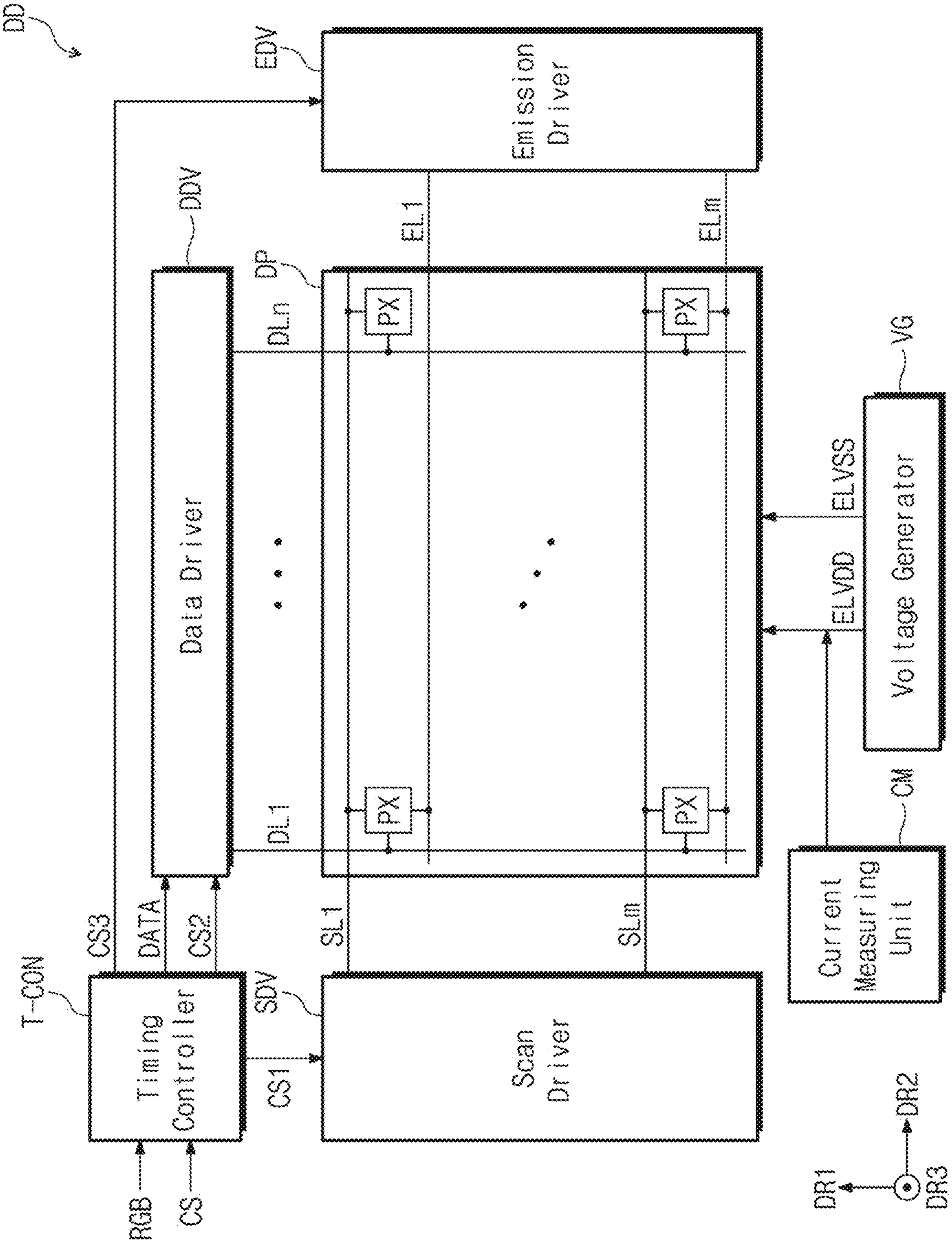
FIG. 2 is a block diagram of a display device illustrated in FIG. 1.

FIG. 2 is a block diagram of a display device illustrated in FIG. 1.

Referring to FIG. 2, an embodiment of the display device DD may include a display panel DP, a scan driver SDV, a data driver DDV, an emission driver EDV, a timing controller T-CON, a voltage generator VG, and a current measuring unit CM.

The display panel DP may include a plurality of pixels PX, a plurality of scan lines SL1 to SLm, a plurality of data lines DL1 to DLn, and a plurality of emission lines EL1 to ELm. Here, 'm' and 'n' are natural numbers.

The scan lines SL1 to SLm may extend in the second direction DR2 to be connected to the pixels PX and the scan driver SDV. The data lines DL1 to DLn may extend in the first direction DR1 to be connected to the pixels PX and the data driver DDV. The emission lines EL1 to ELm may extend in the second direction DR2 to be connected to the pixels PX and the emission driver EDV.

A first voltage ELVDD and a second voltage ELVSS having a lower level than the first voltage ELVDD may be applied to the display panel DP. The first voltage ELVDD and the second voltage ELVSS may be applied to the pixels PX.

The timing controller T-CON may receive image signals RGB and a control signal CS from the outside (e.g., a system board). The timing controller T-CON may generate image data DATA by converting the data format of the image signals RGB to match the interface specification with the data driver DDV. The timing controller T-CON may provide the image data of which data format are converted to the data driver DDV.

The timing controller T-CON may generate and output a first control signal CS1, a second control signal CS2, and a third control signal CS3 in response to the control signal CS provided from the outside. The first control signal CS1 may be defined as a scan control signal, the second control signal CS2 may be defined as a data control signal, and the third control signal CS3 may be defined as an emission control signal. The first control signal CS1 may be provided to the scan driver SDV, the second control signal CS2 may be provided to the data driver DDV, and the third control signal CS3 may be provided to the emission driver EDV.

The scan driver SDV may generate a plurality of scan signals in response to the first control signal CS1. The scan signals may be applied to the pixels PX through the scan lines SL1 to SLm. The data driver DDV may generate a plurality of data voltages corresponding to the image data DATA in response to the second control signal CS2. The data voltages may be applied to the pixels PX through the data lines DL1 to DLn. The emission driver EDV may generate a plurality of emission signals in response to the third control signal CS3. The emission signals may be applied to the pixels PX through the emission lines EL1 to ELm.

The pixels PX may receive the data voltages in response to the scan signals. The pixels PX may display an image by emitting light having a luminance corresponding to the data voltages in response to the emission signals. The emission time of the pixels PX may be controlled by the emission signals.

The voltage generator VG may generate the first voltage ELVDD and the second voltage ELVSS and may apply the first voltage ELVDD and the second voltage ELVSS to the display panel DP. The pixels PX may be driven by the first and second voltages ELVDD and ELVSS. The current measuring unit CM may measure a current with respect to the first voltage ELVDD. A specific configuration of the current measuring unit CM will be described in detail below.

Figure 3:
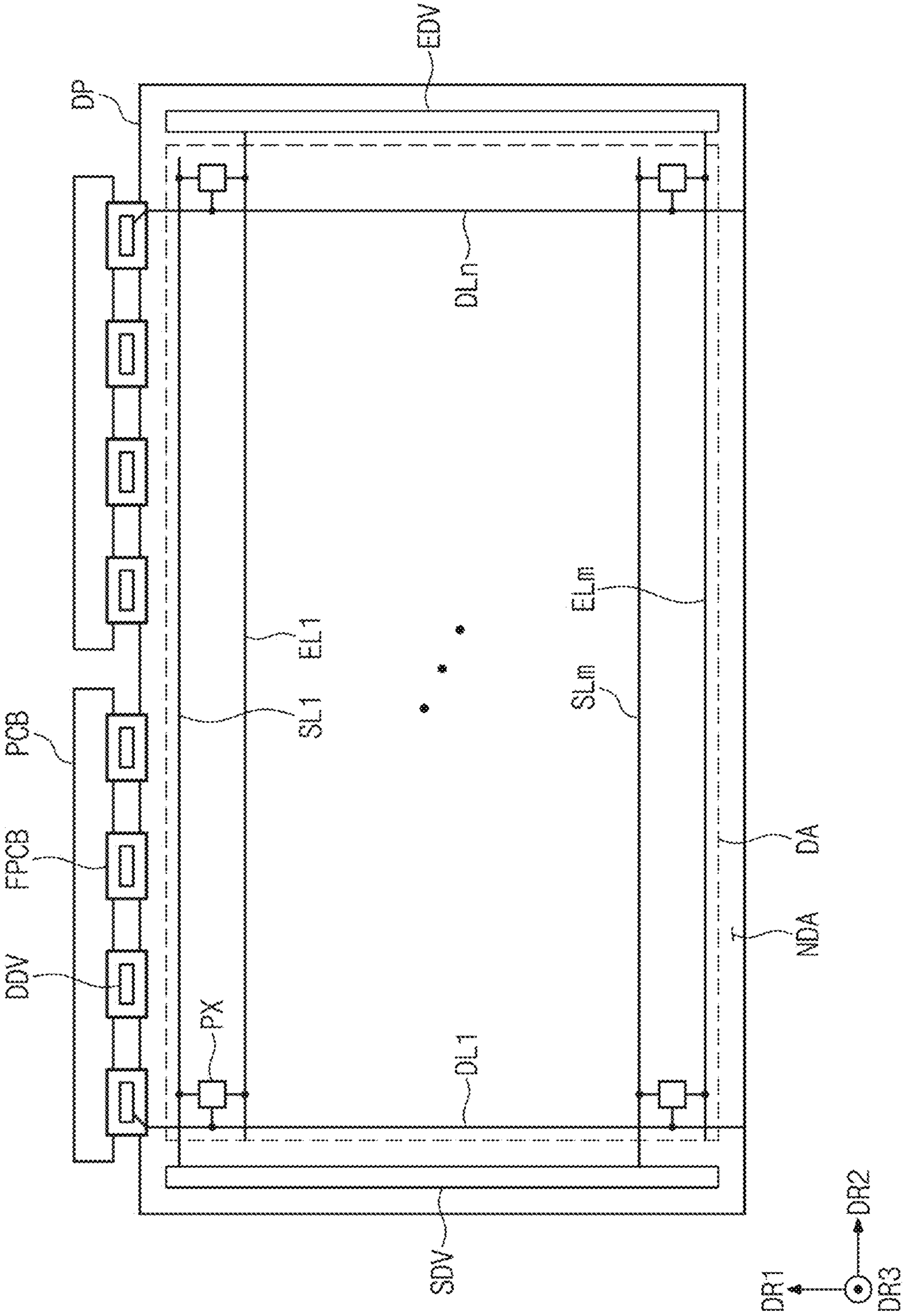
FIG. 3 is a plan view of a display panel illustrated in FIG. 2.

FIG. 3 is a plan view of a display panel illustrated in FIG. 2.

Hereinafter, any repetitive detailed description of the same or like elements in FIG. 3 as those described above with reference to FIGS. 1 and 2 will be omitted or simplified to avoid redundancy.

Referring to FIG. 3, an embodiment of the display panel DP may include the display area DA and the non-display area NDA surrounding the display area DA. The display panel DP may have a rectangular shape having long sides extending in the second direction DR2 and short sides extending in the first direction DR1, but the shape of the display panel DP is not limited thereto.

The display panel DP may be a flexible display panel. The display panel DP according to an embodiment of the disclosure may be a light emitting display panel, and is not particularly limited thereto. In an embodiment, for example, the display panel DP may be an organic light emitting display panel or an inorganic light emitting display panel. An emission layer of the organic light emitting display panel may include an organic light emitting material. An emission layer of the inorganic light emitting display panel may include quantum dots and quantum rods. Hereinafter, embodiments where the display panel DP is an organic light emitting display panel will be described in detail.

The pixels PX may be disposed in the display area DA. The scan driver SDV and the emission driver EDV may be disposed in the non-display area NDA adjacent to the short sides of the display panel DP, respectively.

A plurality of data drivers DDV may be provided. The data drivers DDV may be disposed adjacent to an upper side of the display panel DP, which is defined as one of the long sides of the display panel DP. The printed circuit boards PCB may be disposed adjacent to an upper side of the display panel DP. Flexible circuit boards FPCB may be connected to an upper side of the display panel DP and to the printed circuit boards PCB. The data drivers DDV may be manufactured in the form of an integrated circuit chip and may be mounted on the flexible circuit boards FPCB, respectively.

The data lines DL1 to DLn may extend to the flexible circuit boards FPCB and may be connected to the data drivers DDV. In FIG. 3, only two data lines DL1 and DLn disposed on the leftmost and rightmost sides and connected to the data drivers DDV as illustrated for convenience of illustration, but in such an embodiment, a plurality of data lines may be connected in each of the data drivers DDV.

Although not illustrated, the above-described timing controller T-CON may be manufactured in the form of an integrated circuit chip and mounted on the printed circuit boards PCB. In addition, although not illustrated, the voltage generator VG and the current measuring unit CM may also be disposed on the printed circuit boards PCB.

Figure 4A:
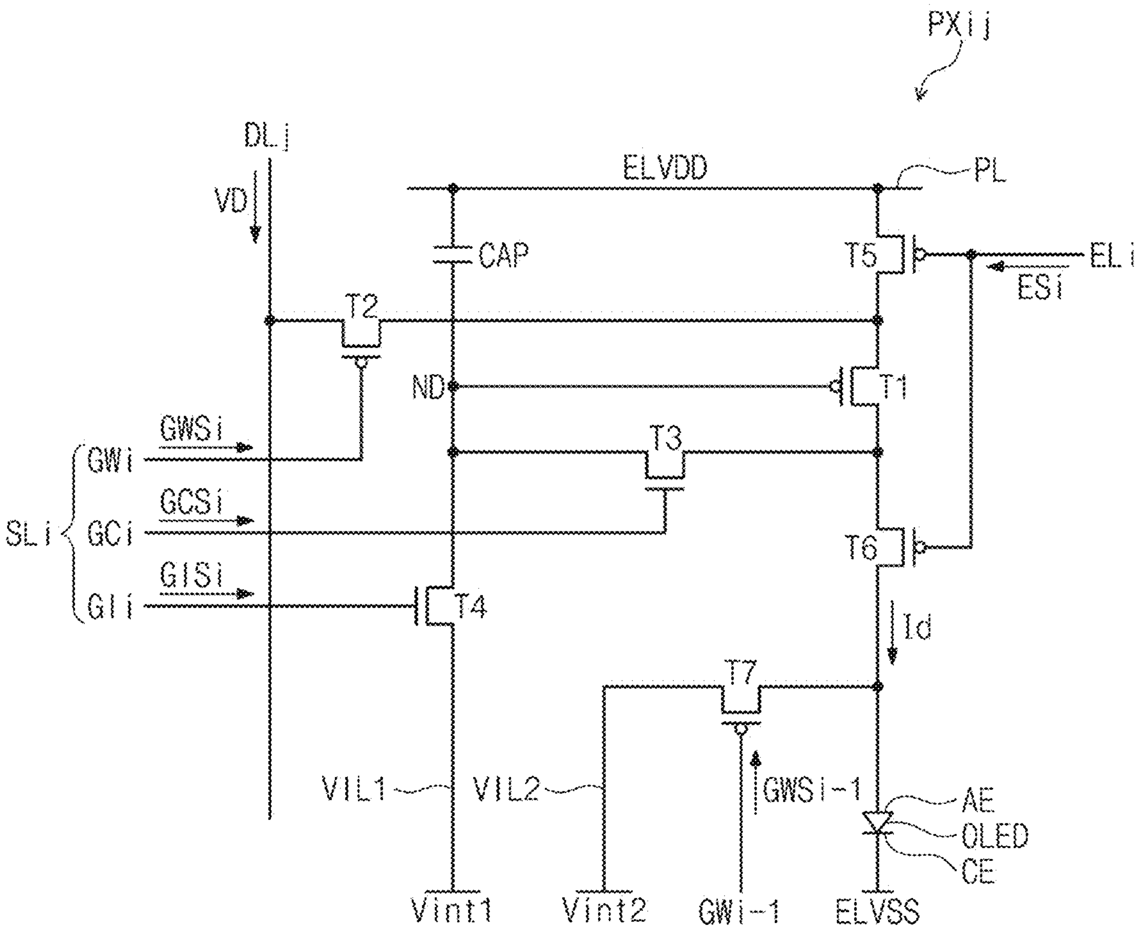
FIG. 4A is a diagram illustrating an equivalent circuit of one pixel illustrated in FIG. 2.
Figure 4B:
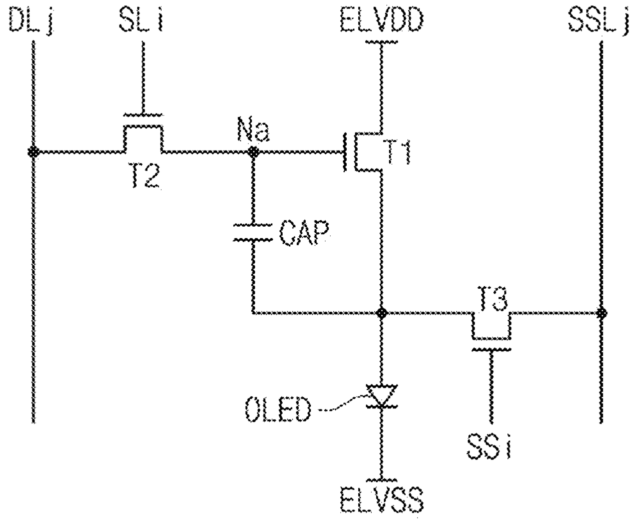
FIG. 4B is a diagram illustrating an equivalent circuit of a pixel, according to an embodiment of the disclosure.
Figure 5:
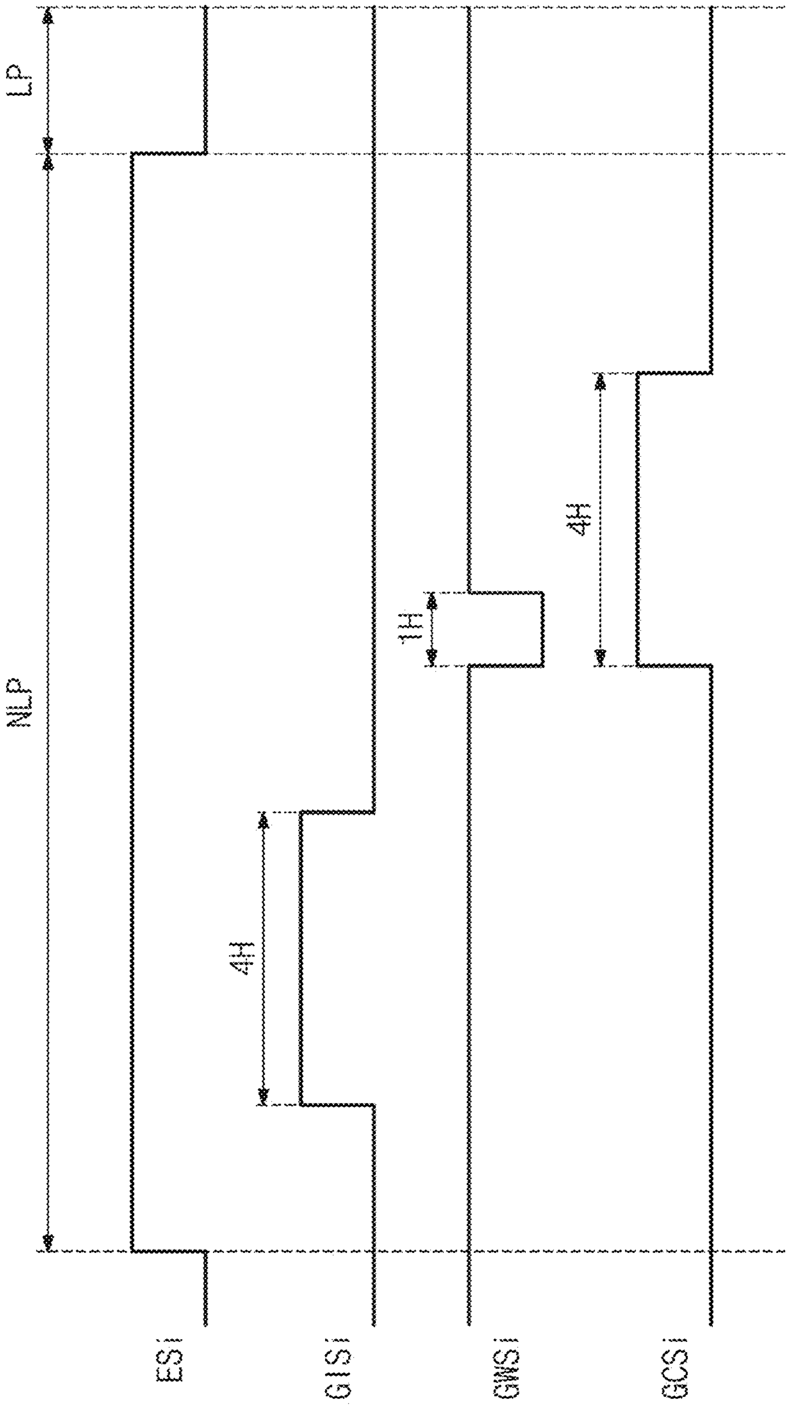
FIG. 5 is a timing diagram of signals for driving a pixel illustrated in FIG. 4A.

FIG. 4A is a diagram illustrating an equivalent circuit of one pixel illustrated in FIG. 2. FIG. 4B is a diagram illustrating an equivalent circuit of a pixel, according to an embodiment of the disclosure. FIG. 5 is a timing diagram of signals for driving a pixel illustrated in FIG. 4A.

In FIG. 4, an embodiment of a pixel PXij connected to scan lines SLi, an i-th emission line ELi, and a j-th data line DLj is illustrated as an example. Here, 'i' and 'j' are natural numbers.

Referring to FIGS. 4A and 5, the pixel PXij may include a light emitting device OLED, a plurality of transistors T1 to T7, and a capacitor CAP. The transistors T1 to T7 and the capacitor CAP may control an amount of current flowing through the light emitting device OLED. The light emitting device OLED may generate light having a predetermined luminance corresponding to the amount of received current.

The plurality of scan lines SLi may include an i-th write scan line GWi, an i-th compensation scan line GCi, and an i-th initialization scan line GIi. The i-th write scan line GWi may receive an i-th write scan signal GWSi, the i-th compensation scan line GCi may receive an i-th compensation scan signal GCSi, and the i-th initialization scan line GIi may receive an i-th initialization scan signal GISi.

In an embodiment, as shown in FIG. 5, the i-th initialization scan signal GISi may be activated during a 4 horizontal (H) period 4H. The i-th write scan signal GWSi may be activated during a 1H period 1H after the i-th initialization scan signal GISi is deactivated. The i-th compensation scan signal GCSi may be activated at the same time as the i-th write scan signal GWSi, and may be activated during a 4H period 4H. The activation period may have a high level value.

Each of the transistors T1 to T7 may include a source electrode, a drain electrode, and a gate electrode. Hereinafter, for convenience of description in FIGS. 4A and 4B, any one of the source electrode and the drain electrode is referred to as a first electrode and the other thereof is referred to as a second electrode. Also, the gate electrode is referred to as a control electrode.

The transistors T1 to T7 may include the first to seventh transistors T1 to T7. The first, second, fifth, sixth, and seventh transistors T1, T2, T5, T6, and T7 may include p-channel metal-oxide-semiconductor (PMOS) transistors. The third and fourth transistors T3 and T4 may include n-channel metal-oxide-semiconductor (NMOS) transistors.

The light emitting device OLED may include an organic light emitting device. The light emitting device OLED may include an anode AE and a cathode CE. The anode AE may receive the first voltage ELVDD through the sixth, first, and fifth transistors T6, T1, and T5. The cathode CE may receive the second voltage ELVSS.

The first transistor T1 may be connected between the fifth transistor T5 and the sixth transistor T6. The first transistor T1 may include a first electrode that receives the first voltage ELVDD through the fifth transistor T5, a second electrode connected to the anode AE through the sixth transistor T6, and a control electrode connected to a node ND.

The first electrode of the first transistor T1 may be connected to the fifth transistor T5, and the second electrode of the first transistor T1 may be connected to the sixth transistor T6. The first transistor T1 may control the amount of current flowing through the light emitting device OLED based on a voltage of the node ND applied to the control electrode of the first transistor T1.

The second transistor T2 may be connected between the data line DLj and the first electrode of the first transistor T1. The second transistor T2 may include a first electrode connected to the data line DLj, a second electrode connected to the first electrode of the first transistor T1, and a control electrode connected to the i-th write scan line GWi.

The second transistor T2 may be turned-on by the i-th write scan signal GWSi applied through the i-th write scan line GWi to electrically connect the data line DLj to the first electrode of the first transistor T1. The second transistor T2 may perform a switching operation of providing a data voltage VD applied through the data line DLj to the first electrode of the first transistor T1.

The third transistor T3 may be connected between the second electrode of the first transistor T1 and the node ND. The third transistor T3 may include a first electrode connected to the second electrode of the first transistor T1, a second electrode connected to the node ND, and a control electrode connected to the i-th compensation scan line GCi.

The third transistor T3 may be turned-on by the i-th compensation scan signal GCSi applied through the i-th compensation scan line GCi to electrically connect the second electrode of the first transistor T1 to the control electrode of the first transistor T1. When the third transistor T3 is turned-on, the first transistor T1 and the third transistor T3 may be connected in a diode form to each other.

The fourth transistor T4 may be connected to the node ND. The fourth transistor T4 may include a first electrode connected to the node ND, a second electrode that receives a first initialization voltage Vint1, and a control electrode connected to the i-th initialization scan line GIi. The fourth transistor T4 is turned-on by the i-th initialization scan signal GISi applied through the i-th initialization scan line GIi to provide the first initialization voltage Vint1 to the node ND.

The fifth transistor T5 may include a first electrode that receives the first voltage ELVDD, a second electrode connected to the first electrode of the first transistor T1, and a control electrode connected to the i-th emission line ELi. The first electrode of the fifth transistor T5 may be connected to a power line PL to which the first voltage ELVDD is applied.

The sixth transistor T6 may include a first electrode connected to the second electrode of the first transistor T1, a second electrode connected to the anode AE, and a control electrode connected to the i-th emission line ELi.

The fifth transistor T5 and the sixth transistor T6 may be turned-on by an i-th emission signal ESi applied through the i-th emission line ELi. A high level period of the i-th emission signal ESi may be defined as a non-emission period NLP, and a low level period of the i-th emission signal ESi may be defined as an emission period LP. As the first voltage ELVDD may be provided to the light emitting device OLED by the turned-on fifth transistor T5 and the turned-on sixth transistor T6, a driving current Id may flow through the light emitting device OLED. Accordingly, the light emitting device OLED may emit light.

The seventh transistor T7 may include a first electrode connected to the anode AE, a second electrode that receives a second initialization voltage Vint2, and a control electrode connected to an (i−1)-th write scan line GWi−1. The (i−1)-th write scan line GWi−1 may be defined as a write scan line immediately before the i-th write scan line GWi. The seventh transistor T7 may be turned-on by an (i−1)-th write scan signal GWSi−1 applied through the (i−1)-th write scan line GWi−1 to provide the second initialization voltage Vint2 to the anode AE.

In an alternative embodiment of the disclosure, the seventh transistor T7 may be omitted. In an embodiment of the disclosure, the second initialization voltage Vint2 may have a different level from the first initialization voltage Vint1, but is not limited thereto, and may have a same level as the first initialization voltage Vint1.

The capacitor CAP may include a first electrode that receives the first voltage ELVDD and a second electrode connected to the node ND. When the fifth transistor T5 and the sixth transistor T6 are turned-on, the amount of current flowing through the first transistor T1 may be determined depending on a voltage stored in the capacitor CAP.

Referring to FIG. 4B, in an embodiment, the pixel PXij may include the first transistor T1, the second transistor T2, the third transistor T3, the light emitting device OLED, and the capacitor CAP. The first transistor T1 may be defined as a driving transistor, the second transistor T2 may be defined as a switching transistor, and the third transistor T3 may be defined as a sensing transistor.

The first transistor T1 may include a first electrode that receives the first voltage ELVDD, a second electrode connected to the anode of the light emitting device OLED, and a control electrode connected to a first node Na. The first transistor T1 may control the amount of current flowing through the light emitting device OLED in response to a gate-source voltage value.

The second transistor T2 may include a first electrode connected to the j-th data line DLj, a second electrode connected to the first node Na, and a control electrode connected to the i-th scan line SLi. The second transistor T2 may be turned-on by the scan signal applied from the i-th scan line SLi to supply the data voltage received from the j-th data line DLj to the capacitor CAP. The capacitor CAP may charge the data voltage.

The capacitor CAP may include a first electrode connected to the first node Na and a second electrode connected to the anode of the light emitting device OLED.

The third transistor T3 may include a first electrode connected to a j-th sensing line SSLj, a second electrode connected to the anode of the light emitting device OLED, and a control electrode connected to an i-th sensing scan line SSi. The third transistor T3 may be turned-on in response to a sensing signal applied through the i-th sensing scan line SSi. When the third transistor T3 is turned-on, the sensing current flowing through the first transistor T1 may be output through the third transistor T3 and the j-th sensing line SSLj.

The light emitting device OLED may include an anode connected to the second electrode of the first transistor T1 and a cathode that receives the second voltage ELVSS. The light emitting device OLED may generate light corresponding to the amount of current supplied from the first transistor T1.

Figure 6:
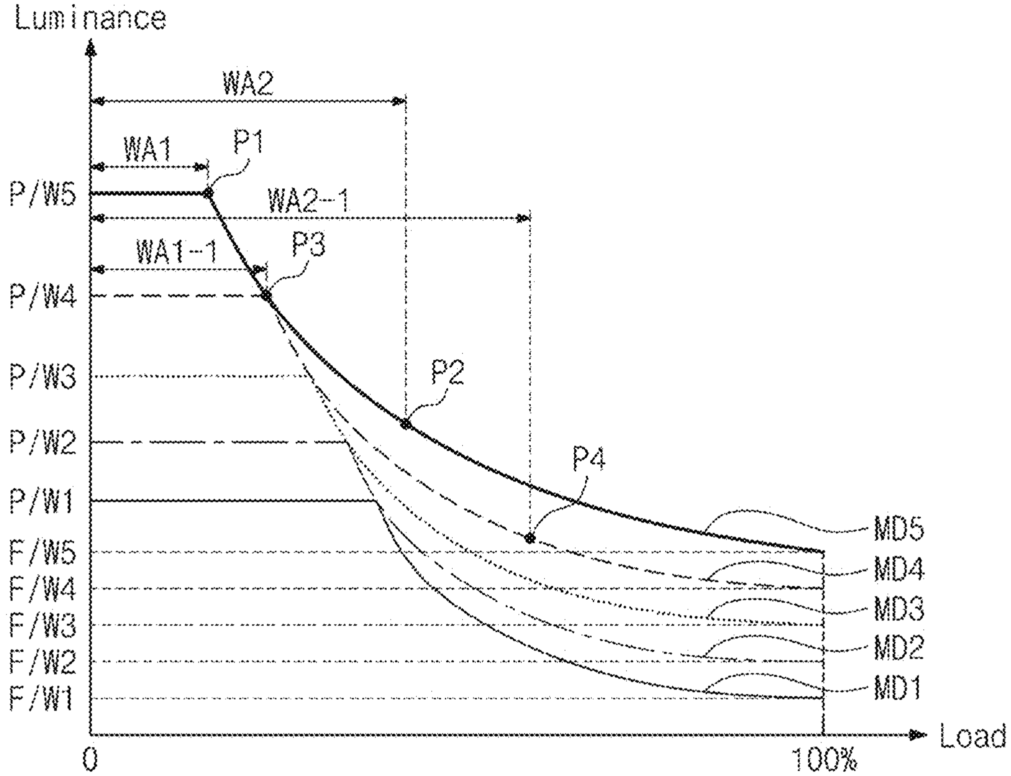
FIG. 6 is a diagram illustrating luminance values of modes for driving a display panel illustrated in FIG. 2 as an example.

FIG. 6 is a diagram illustrating luminance values of modes for driving a display panel illustrated in FIG. 2.

Referring to FIG. 6, a horizontal axis indicates a load, and a vertical axis indicates luminance. The light emitting devices OLED may act as a load to drive the display panel DP. When the number of the driven light emitting devices OLED increases, a load may increase.

In an embodiment, for example, as the display area driven in a white mode increases, the number of light emitting devices OLED driven in the white mode may increase. In this case, more power consumption may be used due to an increase in load. When the load (Load) is 100%, the display panel DP may be driven in a full-white mode. In an embodiment of the disclosure, the display panel DP may be driven by limiting the current value supplied to the light emitting devices OLED, but lowering the luminance of an area displayed in the white mode as the load increases. This operation will be described in detail below.

The display panel DP may be driven in modes MD1 to MD5 having various luminance values. Although the five modes MD1 to MD5 are illustrated for example, the number of modes for driving the display panel DP is not limited thereto.

The modes MD1 to MD5 may include the first to fifth modes MD1 to MD5. Graphs illustrated in FIG. 6 represent luminance change curves of the first to fifth modes MD1 to MD5 according to a change in load.

The display panel DP may be driven in a mode selected from among the first to fifth modes MD1 to MD5. The first to fifth modes MD1 to MD5 may include different peak-white luminance values P/W1 to P/W5, respectively, and different full-white luminance values F/W1 to F/W5, respectively. When one of the first mode MD1 to the fifth mode MD5 is selected, the display panel DP may be driven in the selected mode.

The peak-white luminance values P/W1 to P/W5 may increase from the first mode MD1 to the fifth mode MD5. The peak-white luminance values P/W1 to P/W5 may be respectively defined as maximum luminance values of the first to fifth modes MD1 to MD5. The full-white luminance values F/W1 to F/W5 may increase from the first mode MD1 to the fifth mode MD5. The full-white luminance values F/W1 to F/W5 may be respectively defined as luminance values of the first to fifth modes MD1 to MD5 when the load is 100%.

The first to fifth modes MD1 to MD5 have peak-white luminance values P/W1 to P/W5 at a load in a predetermined range, and thereafter, as the load increases, the luminance values of the first to fifth modes MD1 to MD5 may be lowered. The luminance values decrease as the load increases, and when the load is 100%, the first to fifth modes MD1 to MD5 may have the full-white luminance values F/W1 to F/W5.

The first mode MD1 may include the first peak-white luminance value P/W1 and the first full-white luminance value F/W1. The second mode MD2 may include the second peak-white luminance value P/W2 greater than the first peak-white luminance value P/W1 and the second full-white luminance value F/W2 greater than the first full-white luminance value F/W1. The third mode MD3 may include the third peak-white luminance value P/W3 greater than the second peak-white luminance value P/W2 and the third full-white luminance value F/W3 greater than the second full-white luminance value F/W2.

The fourth mode MD4 may include the fourth peak-white luminance value P/W4 greater than the third peak-white luminance value P/W3 and the fourth full-white luminance value F/W4 greater than the third full-white luminance value F/W3. The fifth mode MD5 may include the fifth peak-white luminance value P/W5 greater than the fourth peak-white luminance value P/W4 and the fifth full-white luminance value F/W5 greater than the fourth full-white luminance value F/W4.

Figure 7:
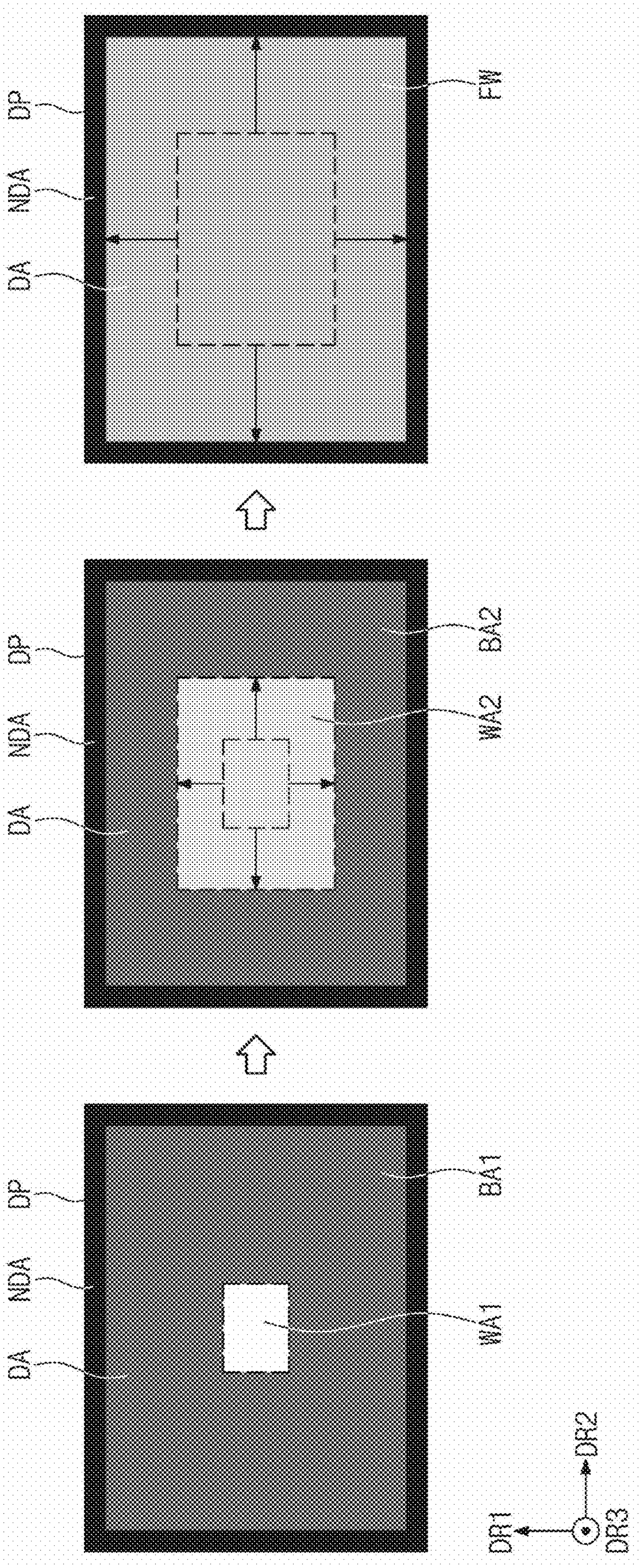
FIG. 7 is a diagram for describing an operation of a display panel, according to a fifth mode illustrated in FIG. 6.

FIG. 7 is a diagram for describing an operation of a display panel, according to a fifth mode illustrated in FIG. 6.

Hereinafter, an operation of a display panel in a fifth mode will be described with reference to FIG. 7 together with FIG. 6.

Referring to FIGS. 6 and 7, the display panel DP may be driven in the fifth mode MD5. When the display panel DP is driven in the fifth mode MD5, the display area DA may include a first white area WA1 and a first black area BA1. The first white area WA1 may be driven in the white mode to display a white color, and the first black area BA1 may be driven in a black mode to display a black color. The first black area BA1 may be defined as the remaining display area DA except for the first white area WA1.

The light emitting devices OLED disposed in the first white area WA1 may be driven in the white mode. A first current may be supplied to the first white area WA1, and the first white area WA1 may be displayed with the fifth peak-white luminance value P/W5. That is, in the fifth mode MD5, the first white area WA1 may display the white color of the highest grayscale. The luminance of the first white area WA1 may be displayed as a luminance corresponding to a first point P1 illustrated in FIG. 6.

In this case, a second white area WA2 that is wider than the first white area WA1 may be driven in the white mode. The second white area WA2 may have a larger area than the first white area WA1. A first current may be supplied to the second white area WA2.

In the second white area WA2 having a larger area than the first white area WA1, the number of the light emitting devices OLED driven in the white mode increases, and thus the load may increase. Accordingly, power consumption (or a current) may increase in a case where the second white area WA2 maintains a same luminance as that of the first white area WA1.

In an embodiment of the disclosure, the current value is limited to the first current, and the luminance of the second white area WA2 may be lowered. The luminance of the second white area WA2 may be lowered, and the limited first current may be distributed and supplied to the light emitting devices OLED of the second white area WA2 having an area larger than that of the first white area WA1. In an embodiment, for example, the second white area WA2 may be displayed with a luminance corresponding to a second point P2 illustrated in FIG. 6. According to this operation, as the load increases, the luminance of the display area driven in the white mode may decrease.

The entire display area DA may be driven in the white mode FW as the load is greater than the second white area WA2. That is, the display area DA may be driven in the full-white mode FW and the load may be 100%. As the load increases, the luminance of the white color may decrease, and in the fifth mode MD5, the luminance of the white color in the full-white mode FW may be the lowest. In the full-white mode FW, the display area DA may emit light with the fifth full-white luminance value F/W5.

Figure 8:
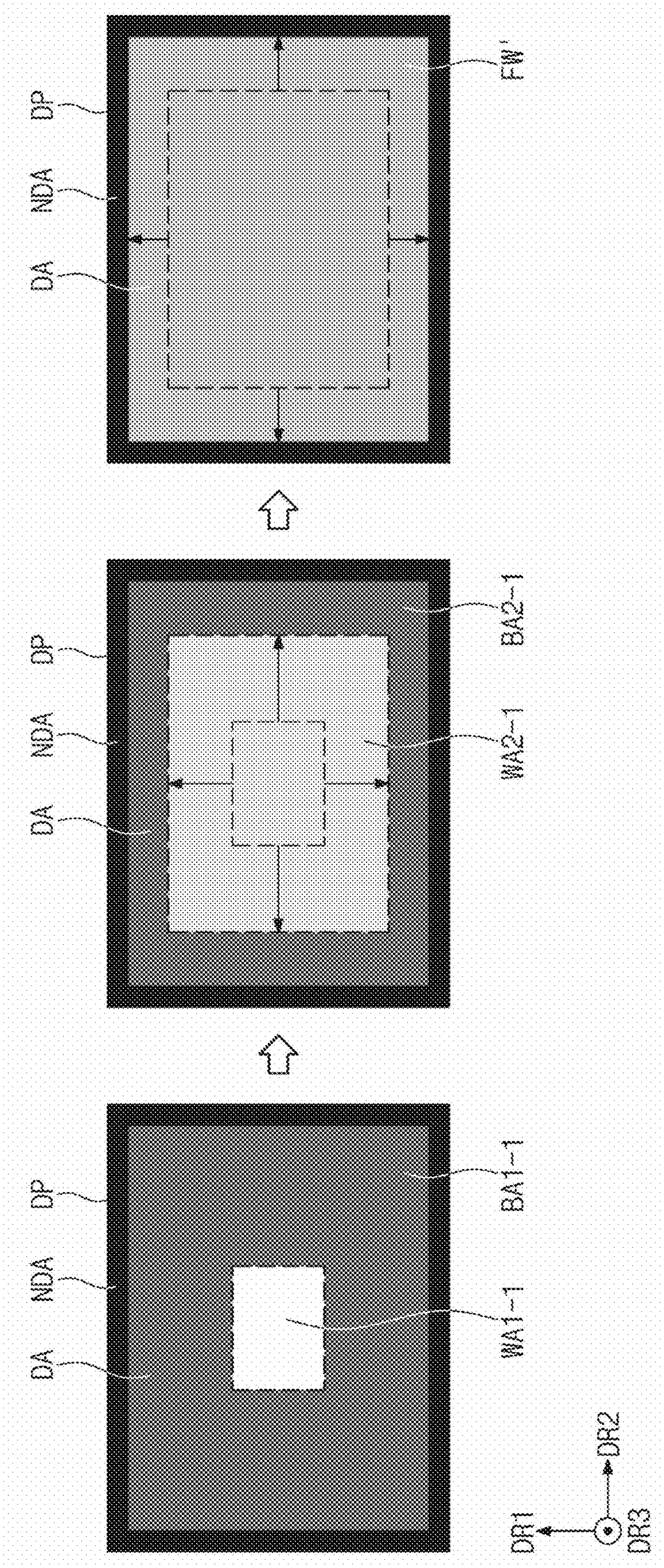
FIG. 8 is a diagram for describing an operation of a display panel, according to a fourth mode illustrated in FIG. 6.

FIG. 8 is a diagram for describing an operation of a display panel, according to a fourth mode illustrated in FIG. 6.

Hereinafter, an operation of a display panel in a fourth mode will be described with reference to FIG. 8 together with FIG. 6.

Referring to FIGS. 6 and 8, the display panel DP may be driven with a luminance lower than that of the fifth mode MD5. In an embodiment, for example, as the display panel DP may be driven in the fourth mode MD4 having a luminance lower than that of the fifth mode MD5, power consumption of the display panel DP may be less than that of the fifth mode MD5.

When the display panel DP is driven in the fourth mode MD4, the display area DA may include a first white area WA1-1 driven in the white mode and a first black area BA1-1 driven in the black mode.

The light emitting devices OLED disposed in the first white area WA1-1 may be driven in the white mode. A second current may be supplied to the first white area WA1-1, and the first white area WA1-1 may be displayed with the fourth peak-white luminance value P/W4. The luminance of the first white area WA1-1 may be displayed as a luminance corresponding to a third point P3 illustrated in FIG. 6.

As the second current may be supplied to the second white area WA2-1, which is wider than the first white area WA1-1, the second white area WA2-1 may be driven in the white mode. In the second white area WA2-1 having a larger area than the first white area WA1-1, the number of the light emitting devices OLED driven in the white mode increases, and thus the load may increase.

In an embodiment of the disclosure, the current value is limited to the second current, and the luminance of the second white area WA2-1 may be lowered. The luminance of the second white area WA2-1 may be lowered, and the limited second current may be distributed and supplied to the light emitting devices OLED of the second white area WA2-1 having a large area. In an embodiment, for example, the second white area WA2-1 may be displayed with a luminance corresponding to a fourth point P4 illustrated in FIG. 6.

The entire display area DA may be driven in the full-white mode FW as the load is greater than the second white area WA2-1. In the fourth mode MD4, the display area DA driven in a full-white mode FW' may emit light with the fourth full-white luminance value F/W4.

In an embodiment, for example, although the fifth mode MD5 and the fourth mode MD4 are described above, other modes, i.e., first, second, and third modes MD1, MD2, and MD3, may operate based on the graph shown in FIG. 6 as described above.

Figure 9:
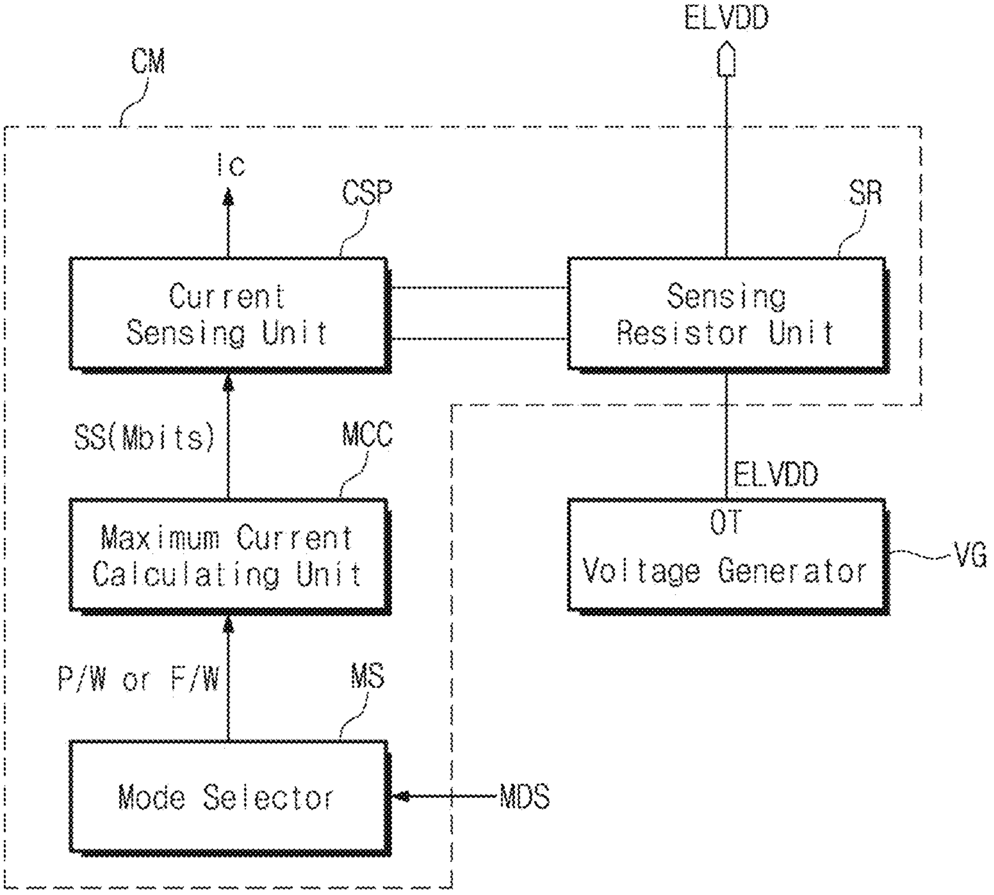
FIG. 9 is a diagram schematically illustrating a block diagram of a current measuring unit illustrated in FIG. 2.

FIG. 9 is a diagram schematically illustrating a block diagram of the current measuring unit illustrated in FIG. 2.

Referring to FIG. 9, the current measuring unit CM may include a sensing resistor unit SR, a current sensing unit CSP, a mode selector MS, and a maximum current calculating unit MCC.

The voltage generator VG may generate the first voltage ELVDD and may provide the first voltage ELVDD to the aforementioned display panel DP through an output terminal OT. The first voltage ELVDD may be defined as a driving voltage. The sensing resistor unit SR may be connected in series to the output terminal OT for outputting the first voltage ELVDD. The sensing resistor unit SR may have a predetermined resistance value.

The current sensing unit CSP may be connected in parallel to the sensing resistor unit SR. The current sensing unit CSP may measure a voltage to the sensing resistor unit SR. The sensing resistor unit SR may calculate and output a driving current value Ic with respect to the driving voltage ELVDD by using the measured voltage value.

The mode selector MS may receive a mode signal MDS. The mode signal MDS may correspond to a display mode set by a user. The display panel DP may be driven in a mode corresponding to one of the first to fifth modes MD1 to MD5 according to the display mode set by the user.

The display mode set by the user may include a set mode, a standard dynamic range (SDR) mode, or a high dynamic range (HDR) mode. The set mode may be defined as a mode for setting brightness with a menu button at the bottom of a monitor or a TV. The SDR mode may be defined as a standard screen mode. The HDR mode may be defined as a mode that maximizes a difference between the bright part and the dark part of the screen.

The mode selector MS may select one of the first to fifth modes MD1 to MD5 in response to the mode signal MDS. The mode selector MS may provide the peak-white luminance value P/W or the full-white luminance value F/W corresponding to the selected mode to the maximum current calculating unit MCC. In an embodiment, both the peak-white luminance value P/W and the full-white luminance value F/W may be provided to the maximum current calculating unit MCC. However, the disclosure is not limited thereto, and alternatively, the mode selector MS may provide only the full-white luminance value F/W of the selected mode to the maximum current calculating unit MCC or only the peak-white luminance value P/W of the selected mode to the maximum current calculating unit MCC.

The maximum current calculating unit MCC may calculate the maximum measured current value using the peak-white luminance value P/W or the full-white luminance value F/W provided from the mode selector MS. The maximum measured current value may be defined as a maximum sensible current value. The peak-white luminance value P/W may be a peak-white luminance value of a mode selected from among the first to fifth peak-white luminance values P/W1 to P/W5. The full-white luminance value F/W may be a full-white luminance value of a mode selected from among the first to fifth full-white luminance values F/W1 to F/W5.

As described above, since the first to fifth modes MD1 to MD5 have different luminance values from each other, the first to fifth modes MD1 to MD5 may have different maximum current values from each other.

The maximum current values of the first to fifth modes MD1 to MD5 may be calculated by the first to fifth peak-white luminance values P/W1 to P/W5 or the first to fifth full-white luminance values F/W1 to F/W5. However, the embodiment of the disclosure is not limited thereto, and alternatively, the maximum current value of the selected mode may be calculated using only the first to fifth full-white luminance values F/W1 to F/W5. In an embodiment, the maximum current value of the selected mode may be calculated using only the first to fifth peak-white luminance values P/W1 to P/W5.

The maximum measured current value may be defined as a maximum current value corresponding to the peak-white luminance value P/W or the full-white luminance value F/W of the selected mode. The maximum measured current value may be defined as a maximum value of a measured current range that can be measured by the current sensing unit CSP.

The maximum current calculating unit MCC may output a selection signal SS corresponding to the maximum measured current value. The selection signal SS may be output as M bits. Here, 'M' is a natural number 2 or more.

The current sensing unit CSP may set a maximum measured voltage value corresponding to the maximum measured current value in response to the selection signal SS. The maximum measured voltage value may be defined as a maximum value of a measured voltage range that can be measured by the current sensing unit CSP. As the maximum measured current value increases, the selection signal SS may have a large value, and as the value of the selection signal SS increases, the maximum measured voltage value may increase. This operation will be described in detail below.

Figure 10:
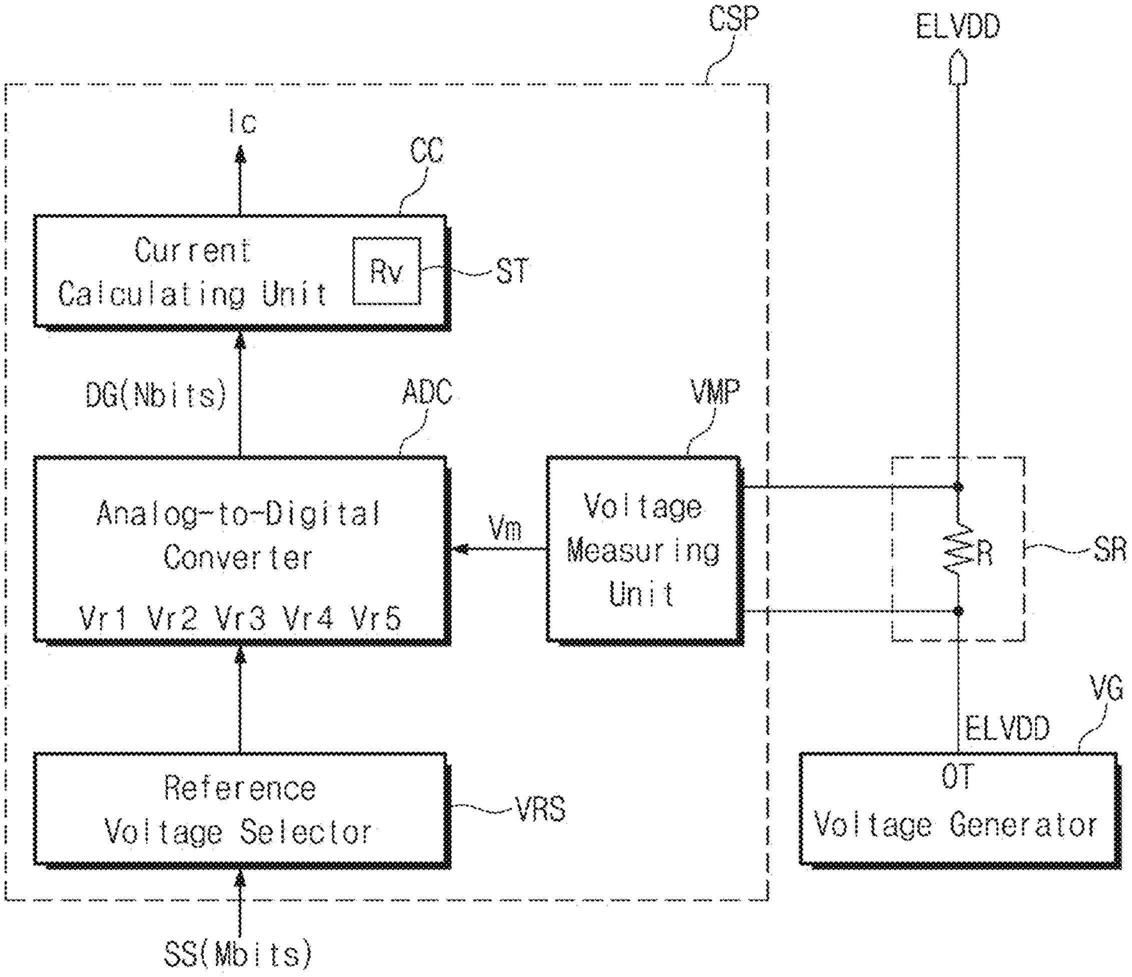
FIG. 10 is a diagram schematically illustrating a block diagram of a current sensing unit illustrated in FIG. 9.

FIG. 10 is a diagram schematically illustrating a block diagram of a current sensing unit illustrated in FIG. 9. FIG. 11 is a diagram illustrating values of a selection signal, a maximum measured voltage, a maximum measured current, and a current resolution, which are set according to modes.

Referring to FIG. 10, in an embodiment, the sensing resistor unit SR may include a resistor R. The current sensing unit CSP may include a voltage measuring unit VMP, an analog-to-digital converter ADC, a reference voltage selector VRS, and a current calculating unit CC.

The resistor R may be connected in series to the output terminal OT. The voltage measuring unit VMP may be connected to both ends of the resistor R and may be connected to the resistor R in parallel. A resistance value (Rs in FIG. 10) of the resistor R may be a fixed value. The voltage measuring unit VMP may measure a voltage across both ends of the sensing resistor unit SR. In an embodiment, for example, the voltage measuring unit VMP may measure a voltage across both ends of the resistor R. The voltage measuring unit VMP may provide a measured voltage value Vm to the analog-to-digital converter ADC.

The reference voltage selector VRS may select the maximum measured voltage value of the analog-to-digital converter ADC in response to the selection signal SS. The analog-to-digital converter ADC may be set to the maximum measured voltage value selected by the reference voltage selector VRS.

In an embodiment, the analog-to-digital converter ADC may be set to have various reference voltages Vr1 to Vr5. The reference voltages Vr1 to Vr5 may be defined as a voltage measurement range of the analog-to-digital converter ADC. The reference voltages Vr1 to Vr5 may be defined as the above-described maximum measured voltage values. A selected one of the reference voltages Vr1 to Vr5 may be set as the maximum measured voltage value of the analog-to-digital converter ADC by the reference voltage selector VRS.

In an embodiment, for example, when the reference voltage of the analog-to-digital converter ADC is set to 160 millivolts (mV) by the reference voltage selector VRS, the analog-to-digital converter ADC may convert voltages in a range of 0 mV to 160 mV to a digital signal. Accordingly, the voltage measurement range of the analog-to-digital converter ADC may be set up to 160 mV, and the maximum measured voltage value may be set to 160 mV.

In an embodiment, one of the reference voltages Vr1 to Vr5 may be selected according to the value of M bits of the selection signal SS. Accordingly, the maximum measured voltage value of the analog-to-digital converter ADC may be variously set according to the selection signal SS.

The maximum measured voltage value in the analog-to-digital converter ADC may be set as a maximum value of N bits. Here, 'N' is a natural number 2 or more. The analog-to-digital converter ADC may convert the measured voltage value Vm into a digital signal DG and may output the digital signal DG. The measured voltage value Vm may be output as the digital signal DG having N bits. The measured voltage value Vm compared to the maximum measured voltage value may be output as N bits.

The measured voltage value Vm may be converted into the digital signal DG of N bits and may be provided to the current calculating unit CC. The resistor R has a fixed (or constant) resistance value Rv, and the resistance value Rv is a preset value or a value known in advance. This resistance value Rv may be stored in a storage unit ST in the current calculating unit CC. The resistance value Rv may then be used for current calculation by the current calculating unit CC. The current calculating unit CC may calculate the driving current value Ic by dividing the measured voltage value Vm output with N bits by the resistance value Rv.

In an embodiment, as shown in FIG. 11, 'M' may be set to 4 and 'N' may be set to 15. The reference voltages Vr1 to Vr5 are defined as first to fifth reference voltages Vr1 to Vr5, and the first to fifth reference voltages Vr1 to Vr5 may be set to 20 mV, 40 mV, 80 mV, 120 mV, and 160 mV, respectively. Maximum measured current values Imax of the first to fifth modes MD1 to MD5 may be set to 5 amperes (A), 10 A, 20 A, 30 A, and 40 A, respectively. The resistance value Rv of the resistor R may be 4 milliohms (mΩ). In FIG. 11, a maximum measured voltage value Vmax may be a reference voltage selected from among the reference voltages Vr1 to Vr5.

Hereinafter, an operation of an embodiment will be described in detail with reference to FIGS. 10 and 11 and together with FIG. 6.

Referring to FIGS. 6, 10, and 11, the maximum current calculating unit MCC may output the selection signal SS with 4 bits. The selection signal SS may be output with bit values of 0000, 1000, 1100, 1110, and 1111, based on the maximum measured current values Imax of the first, second, third, fourth, and fifth modes MD1, MD2, MD3, MD4, and MD5. Here, '0' may indicate 'Off', and '1' may indicate 'On'.

In an embodiment, for example, the maximum current calculating unit MCC may calculate the maximum measured current values Imax depending on the full-white luminance values F/W1 to F/W5 of the first, second, third, fourth, and fifth modes MD1, MD2, MD3, MD4, and MD5. Since the full-white luminance values F/W increase in the order of the first, second, third, fourth, and fifth modes MD1, MD2, MD3, MD4, and MD5, as the full-white luminance value F/W of the selected mode increases, the maximum measured current value Imax may increase. In such an embodiment, as the maximum measured current values Imax increase, the value of the selection signal SS may increase in the order of 0000, 1000, 1100, 1110, and 1111.

In such an embodiment, the bit values of 0000, 1000, 1100, 1110, and 1111 may correspond to 20 mV, 40 mV, 80 mV, 120 mV, and 160 mV, respectively. In an embodiment, for example, when the selection signal SS has the bit value of 1111, the fifth reference voltage Vr5 of 160 mV may be selected as the maximum measured voltage value Vmax. In an embodiment, for example, when the selection signal SS has the bit value of 1100, the third reference voltage Vr3 of 80 mV may be selected as the maximum measured voltage value Vmax. Accordingly, as the value of the selection signal SS increases, the maximum measured voltage value Vmax may increase.

In an embodiment, the analog-to-digital converter ADC may output a digital signal DG of 15 bits. The 15 bits may have 32768 values, which are of $2^{15}$. The value of 32768 may be a maximum decimal value of 15 bits. The analog-to-digital converter ADC may output 32768 measured voltage values.

In an embodiment, when the measured voltage value Vm is the minimum, 000000000000000 is output, and thereafter, the bit value may increase whenever the measured voltage value increases. The maximum measured voltage value Vmax is a maximum value of 15 bits, and may be a 32768-th value, which is a maximum value among 32768 values. When the measured voltage value Vm is the maximum measured voltage value Vmax, 15 bits are 111111111111111, which may represent a 32768-th value.

The digital signal DG output as the measured voltage value Vm from the analog-to-digital converter ADC may be provided to the current calculating unit CC. The current calculating unit CC may calculate the driving current value Ic by dividing the measured voltage value Vm by the resistance value Rv. When the measured voltage value Vm is the maximum value, the driving current value Ic may be calculated as the maximum measured current value Imax.

In an embodiment, when the fifth mode MD5 is selected and the fifth reference voltage Vr5 is selected as the maximum measured voltage value Vmax, the measured voltage value Vm may be 140 mV. The measured voltage value Vm of 140 mV may be output with 15 bits to the current calculating unit CC. In this case, the driving current value Ic is calculated by dividing the measured voltage value Vm of 140 mV by the resistance value Rv of 4 mΩ, and the driving current value Ic may be calculated as 35 A.

In an embodiment, when the fifth reference voltage Vr5 is selected as the maximum measured voltage value Vmax, the measured voltage value Vm may be 160 mV, which is the maximum measured voltage value Vmax. The measured voltage value Vm of 160 mV may be output with 15 bits to the current calculating unit CC. In this case, the driving current value Ic is calculated by dividing the measured voltage value Vm of 160 mV by the resistance value Rv of 4 mΩ, and the driving current value Ic may be calculated as 40 A, which is the maximum measured current value Imax.

In the same manner, when the first to fourth reference voltages Vr1 to Vr4 may be respectively selected as the maximum measured voltage value Vmax according to each of the selected first to fourth modes MD1 to MD4, the driving current value Ic may be calculated by dividing the measured voltage value Vm by the resistance value Rv.

The measured voltage values Vm may be provided as 32768 values of 15 bits, and each value may be divided by the resistance value Rv to calculate the driving current value Ic. Therefore, the driving current value Ic may also be expressed as the number of 32768.

When the fifth reference voltage Vr5 is selected as the maximum measured voltage value Vmax, the maximum measured voltage may be 160 mV, the maximum measured current value Imax may be 40 A, and N=15. In this case, by dividing 40 A by 32768, which is $2^{15}$, a value of 1.2 mA may be calculated. Since the driving current value Ic may be expressed as 32768 values, 1.2 mA may be defined as a minimum unit current value of the driving current value Ic. When the fifth mode MD5 is selected, the minimum unit current value of the driving current value Ic may be set to 1.2 mA.

The minimum unit current value of the driving current value Ic may be defined as the current resolution. Accordingly, the current resolution may be defined as a value obtained by dividing the maximum measured current value Imax by $2^N$. As described above, 'N' may be output as bits (15 bits) of the analog-to-digital converter ADC. When the fifth mode MD5 is selected, the current resolution may be defined as 1.2 mA.

When the fourth reference voltage Vr4 is selected as the maximum measured voltage value Vmax, the maximum measured voltage value Vmax is 120 mV, the maximum measured current value Imax is 30 A, and 0.92 mA may be calculated by dividing 30 A by 32768, which is $2^{15}$. Accordingly, when the fourth mode MD4 is selected, the minimum unit current value of the driving current value Ic may be set to 0.92 mA, and the current resolution may be defined as 0.92 mA.

When the third reference voltage Vr3 is selected as the maximum measured voltage value Vmax, the maximum measured voltage value Vmax is 80 mV, the maximum measured current value Imax is 20 A, and 0.62 mA may be calculated by dividing 20 A by 32768, which is $2^{15}$. Accordingly, when the third mode MD3 is selected, the minimum unit current value of the driving current value Ic may be set to 0.62 mA, and the current resolution may be defined as 0.62 mA.

In the same manner, when the second reference voltage Vr2 is selected as the maximum measured voltage value Vmax, the maximum measured voltage value Vmax is mV, the maximum measured current value Imax is 10 A, the minimum unit current value of the driving current value Ic is set to 0.31 mA, and the current resolution may be defined as 0.31 mA.

In the same manner, when the first reference voltage Vr1 is selected as the maximum measured voltage value Vmax, the maximum measured voltage value Vmax is 20 mV, the maximum measured current value Imax is 5 A, the minimum unit current value of the driving current value Ic is set to 0.15 mA, and the current resolution may be defined as 0.15 mA.

According to the set values, as the maximum measured current value Imax increases, the minimum unit current value defined as the current resolution may increase. In an embodiment, in order from the first mode MD1 to the fifth mode MD5, the full-white luminance values F/W increase, and the selection signal SS, the maximum measured voltage value Vmax, the maximum measured current value Imax, and current resolution may increase. In such an embodiment, in order from the fifth mode MD5 to the first mode MD1, the full-white luminance values F/W decrease, and the selection signal SS, the maximum measured voltage value Vmax, the maximum measured current value Imax, and current resolution may decrease.

In an embodiment of the disclosure, as the maximum measured voltage value Vmax, the maximum measured current value Imax, and the current resolution are variously set depending on the first to fifth modes MD1 to MD5, the current measurement may be performed more efficiently.

The numerical values illustrated in FIG. 11 are shown by way of example, and the embodiment of the disclosure may not be limited to the numerical values illustrated in FIG. 11.

Figure 12:
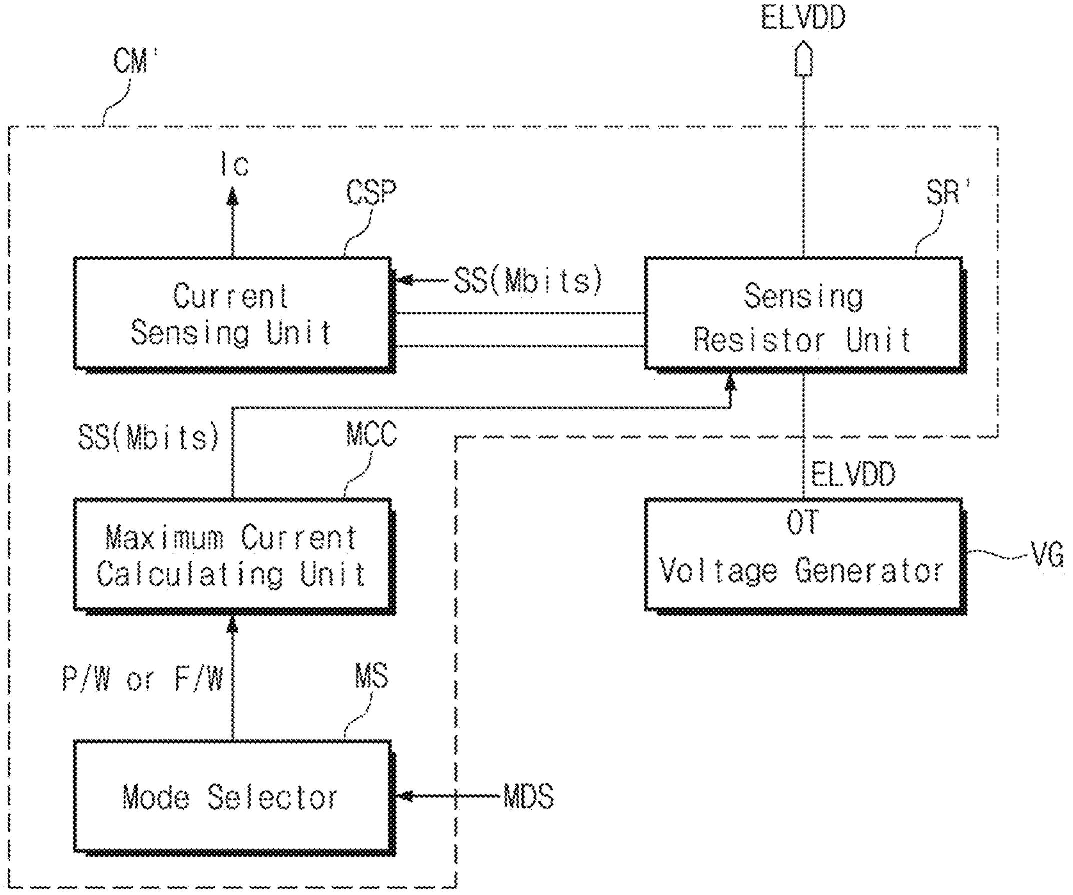
FIG. 12 is a diagram schematically illustrating a block diagram of a current measuring unit, according to an alternative embodiment of the disclosure.

FIG. 12 is a diagram schematically illustrating a block diagram of a current measuring unit, according to an alternative embodiment of the disclosure.

Hereinafter, the configuration of a current measuring unit CM' illustrated in FIG. 12 will be described mainly with a configuration different from the configuration of the current measuring unit CM illustrated in FIG. 9, and the same components are denoted with the same reference numerals.

Referring to FIG. 12, the current measuring unit CM' may include a sensing resistor unit SR', the current sensing unit CSP, the mode selector MS, and the maximum current calculating unit MCC.

The maximum current calculating unit MCC may calculate the maximum measured current value using the peak-white luminance value P/W or the full-white luminance value F/W provided from the mode selector MS. The maximum current calculating unit MCC may output the selection signal SS corresponding to the maximum current value as M bits. In such an embodiment, the selection signal SS may be provided to the sensing resistor unit SR' in FIG. 12.

The sensing resistor unit SR' may be connected to the output terminal OT of the voltage generator VG. The resistance value of the sensing resistor unit SW may be variable. The sensing resistor unit SR may change the resistance value in response to the selection signal SS. As the value of the selection signal SS increases, the resistance value of the sensing resistor unit SR' may be changed to decrease. The resistance value of the sensing resistor unit SR may be set to a value corresponding to the maximum measured current value of the selected mode. This operation will be described in detail below.

The selection signal SS may be provided to the current sensing unit CSP. The current sensing unit CSP may calculate the resistance value of the sensing resistor unit SR' using the selection signal SS. The current sensing unit CSP may perform a current calculation operation using the calculated resistance value. Operations of the current sensing unit CSP and the mode selector MS in an embodiment of FIG. 12 are substantially the same as those of the current sensing unit CSP and the mode selector MS illustrated in FIG. 9, and thus any repetitive detailed descriptions thereof will be omitted to avoid redundancy.

Figure 13:
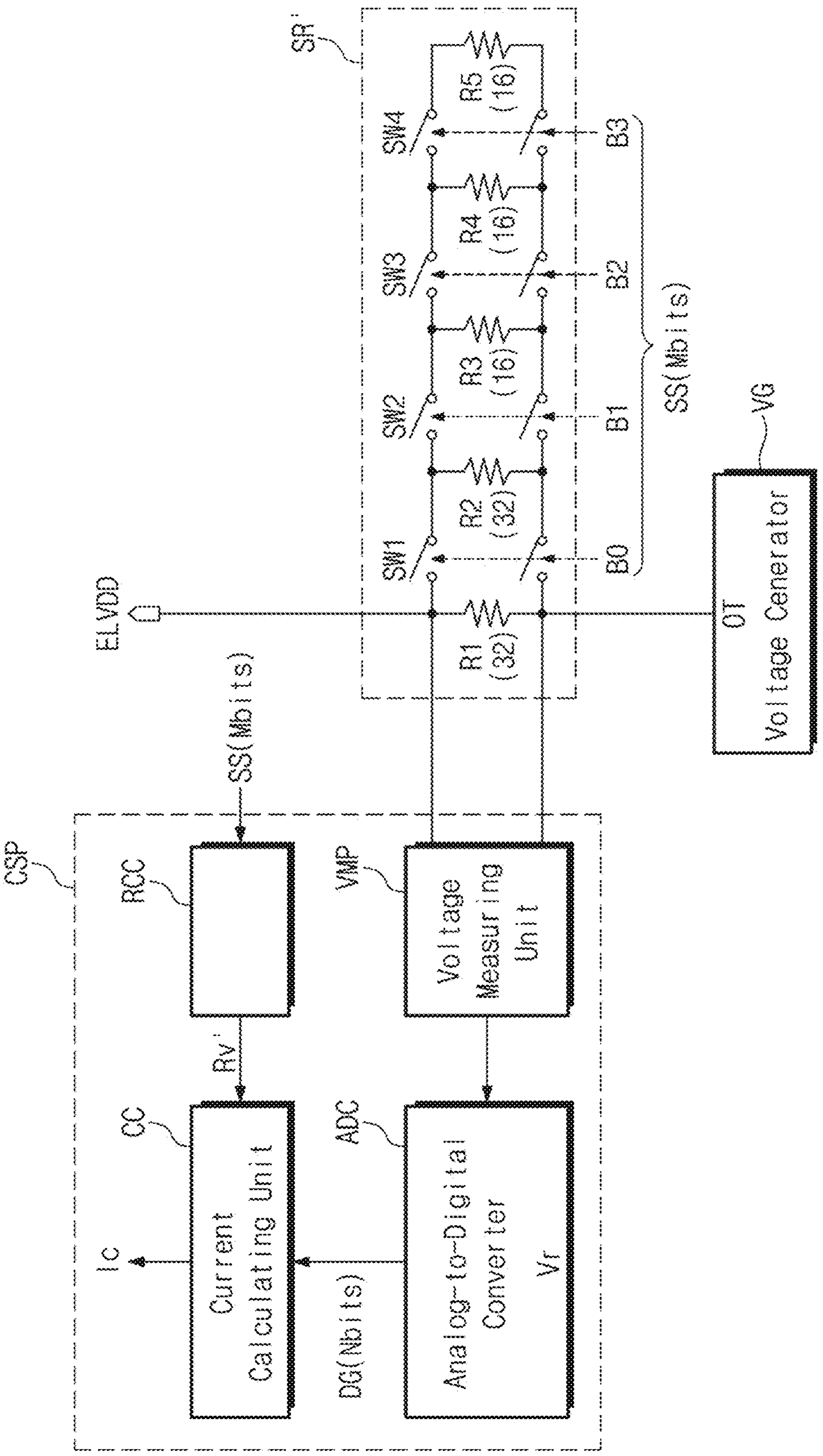
FIG. 13 is a diagram schematically illustrating a block diagram of a current sensing unit illustrated in FIG. 12.

FIG. 13 is a diagram schematically illustrating a block diagram of an embodiment of a current sensing unit illustrated in FIG. 12. FIG. 14 is a diagram illustrating values of a selection signal, a resistance value, a maximum measured current value, and a current resolution, which are set according to modes.

Referring to FIG. 13, the sensing resistor unit SR' may include a plurality of resistors R1 to R5 and a plurality of switches SW1 to SW4. The resistors R1 to R5 may be connected in parallel with one another. In an embodiment, for example, one ends of the resistors R1 to R5 may be connected to one another, and other ends of the resistors R1 to R5 may be connected to one another. The resistors R1 to R5 connected in parallel may be connected to the output terminal OT of the voltage generator VG. In an embodiment, for example, one ends of the resistors R1 to R5 may be connected to the output terminal OT of the voltage generator VG.

The switches SW1 to SW4 may be connected between ends of the resistors R1 to R5 to switch a parallel connection of the resistors R1 to R5. The switches SW1 to SW4 may be on-off controlled by values of M bits of the selection signal SS. The switches SW1 to SW4 may include first to fourth switches SW1 to SW4, and the resistors R1 to R5 may include first to fifth resistors R1 to R5. Each of the first to fourth switches SW1 to SW4 may be provided in pairs. M bits may include ‘0’th to ‘3’rd bits B0 to B3.

In an embodiment, a pair of switches may be disposed between adjacent resistors, e.g., a h-th resistor and a (h+1)-th resistor, to control or switch the parallel connection of the h-th resistor and the (h+1)-th resistor. Here, ‘h’ is a natural number. In an embodiment, for example, the pair of first switches SW1 may be connected between the first resistor R1 and the second resistor R2. The first switches SW1 may be respectively connected to ends of the first resistor R1 and the second resistor R2 and the other ends of the first resistor R1 and the second resistor R2. The first switches SW1 are turned-on or turned-off depending on the value of the corresponding ‘0’th bit B0 among the M bits to control the parallel connection between the first resistor R1 and the second resistor R2.

In such an embodiment, as described above, the second, third, and fourth switches SW2, SW3, and SW4 are also respectively connected between the second to fifth resistors R2 to R5, and may be on-off controlled by the values of the first to third bits B1 to B3. As the turn-on and turn-off of the first to fourth switches SW1 to SW4 are controlled by the M bits, the combined resistance value of the first to fifth resistors R1 to R5 may be variously determined.

The reference voltage Vr of the analog-to-digital converter ADC may be fixed or constant. That is, the maximum measured voltage value of the analog-to-digital converter ADC may be fixed or constant. In an embodiment, for example, the reference voltage Vr may be set to the above-described fifth reference voltage Vr5.

The current sensing unit CSP may include a resistance value calculating unit RCC. The resistance value calculating unit RCC may receive the M bits and may calculate a combined resistance value Rv' of the first to fifth resistors R1 to R5 depending on the values of the M bits. Since the first to fourth switches SW1 to SW4 are controlled by the M bits to determine the combined resistance value Rv' of the first to fifth resistors R1 to R5, the combined resistance value Rv' may be a value corresponding to the M bits. Accordingly, the resistance value calculating unit RCC may calculate the combined resistance value Rv' by using the values of the M bits. The combined resistance value Rv' may be provided to the current calculating unit CC.

The current calculating unit CC may calculate the driving current value Ic by dividing the measured voltage value Vm of the N bits provided from the analog-to-digital converter ADC by the combined resistance value Rv' (hereinafter referred to as the resistance value Rv').

In an embodiment, as described above with reference to FIGS. 12 and 13, the maximum measured voltage value is fixed or constant, and the resistance values of the sensing resistor unit SR' may be changed.

In an embodiment, ‘M’ may be set to 4 and ‘N’ may be set to 15 as shown in FIG. 14. The maximum measured voltage Vmax, which is the reference voltage Vr, may be set to 160 mV. The maximum measured current values Imax of the first to fifth modes MD1 to MD5 may be set to 5 A, 10 A, 20 A, 30 A, and 40 A, respectively. In an embodiment, as shown in FIG. 13, the resistance values of the first, second, third, fourth, and fifth resistors R1, R2, R3, R4, and R5 may be set to 32 mΩ, 32 mΩ, 16 mΩ, 16 mΩ, and 16 mΩ, respectively.

Hereinafter, an operation of an embodiment will be described with reference to FIGS. 13 and 14 together with FIG. 6.

Referring to FIGS. 6, 13, and 14, the selection signal SS of 4 bits may be output as bit values of 0000, 1000, 1100, 1110, and 1111, based on the maximum measured current values Imax of the first, second, third, fourth, and fifth modes MD1, MD2, MD3, MD4, and MD5. The value of "0" may turn off the switches SW1 to SW4 as "Off", and "1" may turn on the switches SW1 to SW4 as "On".

As the full-white luminance value F/W of the selected mode increases, the maximum measured current value Imax increases. Therefore, as the maximum measured current values Imax increase, the value of the selection signal SS may increase in the order of 0000, 1000, 1100, 1110, and 1111.

In an embodiment, as shown in FIG. 14, since 4 bits are 0000 in the first mode MD1, the first to fourth switches SW1 to SW4 may be turned-off by values of the 0th to 3rd-th bits B0 to B3. In this case, the resistance value Rv' may be 32 mΩ, which is the resistance value of the first resistor R1. The selection signal SS having 0000 is provided to the resistance value calculating unit RCC, and the resistance value calculating unit RCC may calculate and output the resistance value Rv' (32 mΩ) corresponding to the selection signal SS.

In such an embodiment, since 4 bits are 1000 in the second mode MD2, the first switches SW1 are turned-on by the value of the 0th bit B0, and the second to fourth switches SW2 to SW4 may be turned-off by values of the first to third bits B1 to B3. In this case, the first and second resistors R1 and R2 are connected in parallel, and the resistance value Rv' may be 16 mΩ, which is the combined resistance value of the first and second resistors R1 and R2. The selection signal SS having 1000 is provided to the resistance value calculating unit RCC, and the resistance value calculating unit RCC may calculate and output the resistance value Rv' (16 mΩ) corresponding to the selection signal SS.

In such an embodiment, since the 4 bits are 1100 in the third mode MD3, the first and second switches SW1 and SW2 are turned-on by the values of the 0th and first bits B1 and B0, and the third and fourth switches SW3 and SW4 may be turned-off by the values of the second and third bits B2 and B3. In this case, the first, second, and third resistors R1, R2, and R3 are connected in parallel, and thus the resistance value Rv' may be 8 mΩ, which is the combined resistance value of the first, second, and third resistors R1, R2, R3. The selection signal SS having 1100 is provided to the resistance value calculating unit RCC, and the resistance value calculating unit RCC may calculate and output the resistance value Rv' (8 mΩ) corresponding to the selection signal SS.

In such an embodiment, since 4 bits are 1110 in the fourth mode MD4, the resistance value Rv' may be 5.33 mΩ. Since 4 bits are 1111 in the fifth mode MD5, the resistance value Rv' may be 4 mΩ. Accordingly, as the values of the selection signal SS increase, the resistance value Rv' may decrease.

In such an embodiment, the maximum measured voltage value Vmax is fixed or constant, and the resistance value Rv' may be variously set. Since the maximum measured current value Imax may be set to 5 A, 10 A, 20 A, 30 A, and 40 A, and the maximum measured voltage value Vmax is fixed to 160 mV, the resistance value Rv' used to calculate the current may be set to 32 mΩ, 16 mΩ, 8 mΩ, 5.33 mΩ and 4 mΩ, based on Ohm's law (V=IR).

The digital signal DG output as the measured voltage value Vm from the analog-to-digital converter ADC may be provided to the current calculating unit CC. The current calculating unit CC may calculate the driving current value Ic by dividing the measured voltage value Vm by the resistance value Rv'. When the measured voltage value Vm is the maximum value, the driving current value Ic may be calculated as the maximum measured current value Imax.

The user may select the first mode MD1 and the measured voltage value Vm may be 100 mV. In this case, the measured voltage value Vm of 100 mV may be output with bits to the current calculating unit CC. The driving current value Ic is calculated by dividing the measured voltage value Vm of 100 mV by the resistance value Rv' of 32 mΩ and the driving current value Ic may be calculated as 3.125 A.

When the user selects the first mode MD1, the measured voltage value Vm may be 160 mV, which is the maximum measured voltage value Vmax. The measured voltage value Vm of 160 mV may be output with 15 bits to the current calculating unit CC. The driving current value Ic is calculated by dividing the measured voltage value Vm by 160 mV by the resistance value Rv' of 32 mΩ, and the driving current value Ic may be calculated as 5 A, which is the maximum measured current value Imax.

When the user selects the fifth mode MD5, the measured voltage value Vm may be 160 mV, which is the maximum measured voltage value Vmax. The measured voltage value Vm of 160 mV may be output with 15 bits to the current calculating unit CC. The driving current value Ic is calculated by dividing the measured voltage value Vm by 160 mV by the resistance value Rv' of 4 mΩ, and the driving current value Ic may be calculated as 40 A, which is the maximum measured current value Imax.

In such an embodiment, the driving current value Ic may be calculated and output by the current calculating unit CC. The measured voltage values Vm may be provided as 32768 values of 15 bits, and each value may be divided by the resistance value Rv' to calculate the driving current value Ic. Therefore, the driving current value Ic may also be expressed as the number of 32768.

In the fifth mode MD5, the maximum measured voltage value Vmax may be 160 mV, and the maximum measured current value Imax may be 40 A depending on the resistance value Rv' of 4 mΩ. Since the measured voltage value Vm is provided as 32768 values, the driving current value Ic may also be expressed as 32768 values. Accordingly, when 40 A is divided by 32768, which is $2^{15}$, a value of 1.2 mA is calculated, and thus the minimum unit current value and current resolution may be 1.2 mA.

In the fourth mode MD4, the maximum measured voltage value Vmax may be 160 mV, and the maximum measured current value Imax may be 30 A depending on the resistance value Rv' of 5.33 mΩ. Since the measured voltage value Vm is provided as 32768 values, the driving current value Ic may also be expressed as 32768 values. Accordingly, when 30 A is divided by 32768, which is $2^{15}$, a value of 0.92 mA is calculated, and thus the minimum unit current value and current resolution may be 0.92 mA.

In the third mode MD3, the maximum measured voltage value Vmax may be 160 mV, and the maximum measured current value Imax may be 20 A depending on the resistance value Rv' of 8 mΩ. Since the measured voltage value Vm is provided as 32768 values, the driving current value Ic may also be expressed as 32768 values. Accordingly, when 20 A is divided by 32768, which is $2^{15}$, a value of 0.62 mA is calculated, and thus the minimum unit current value and current resolution may be 0.62 mA.

Similarly, in the second mode MD2, when 10 A is divided by 32768, which is $2^{15}$ in the second mode MD2, a value of 0.31 mA is calculated, and thus the minimum unit current value and current resolution may be 0.31 mA. Similarly, in the first mode MD1, when 5 A is divided by 32768, which is $2^{15}$ in the first mode MD1, a value of 0.15 mA is calculated, and thus the minimum unit current value and current resolution may be 0.15 mA.

According to the set values, as the maximum measured current value Imax increases, the minimum unit current value defined as the current resolution may increase. In an embodiment, in order from the first mode MD1 to the fifth mode MD5, the full-white luminance values F/W increase, and the selection signal SS, the resistance value Rv', and the maximum measured current value Imax, and current resolution may increase. In such an embodiment, in order from the fifth mode MD5 to the first mode MD1, the full-white luminance value decreases, and the selection signal SS, the resistance value Rv', the maximum measured current value Imax, and the current resolution may decrease.

In an embodiment of the disclosure, as the resistance value Rv', the maximum measured current value Imax, and the current resolution are variously set depending on the first to fifth modes MD1 to MD5, the current measurement may be performed more efficiently.

Figure 15:
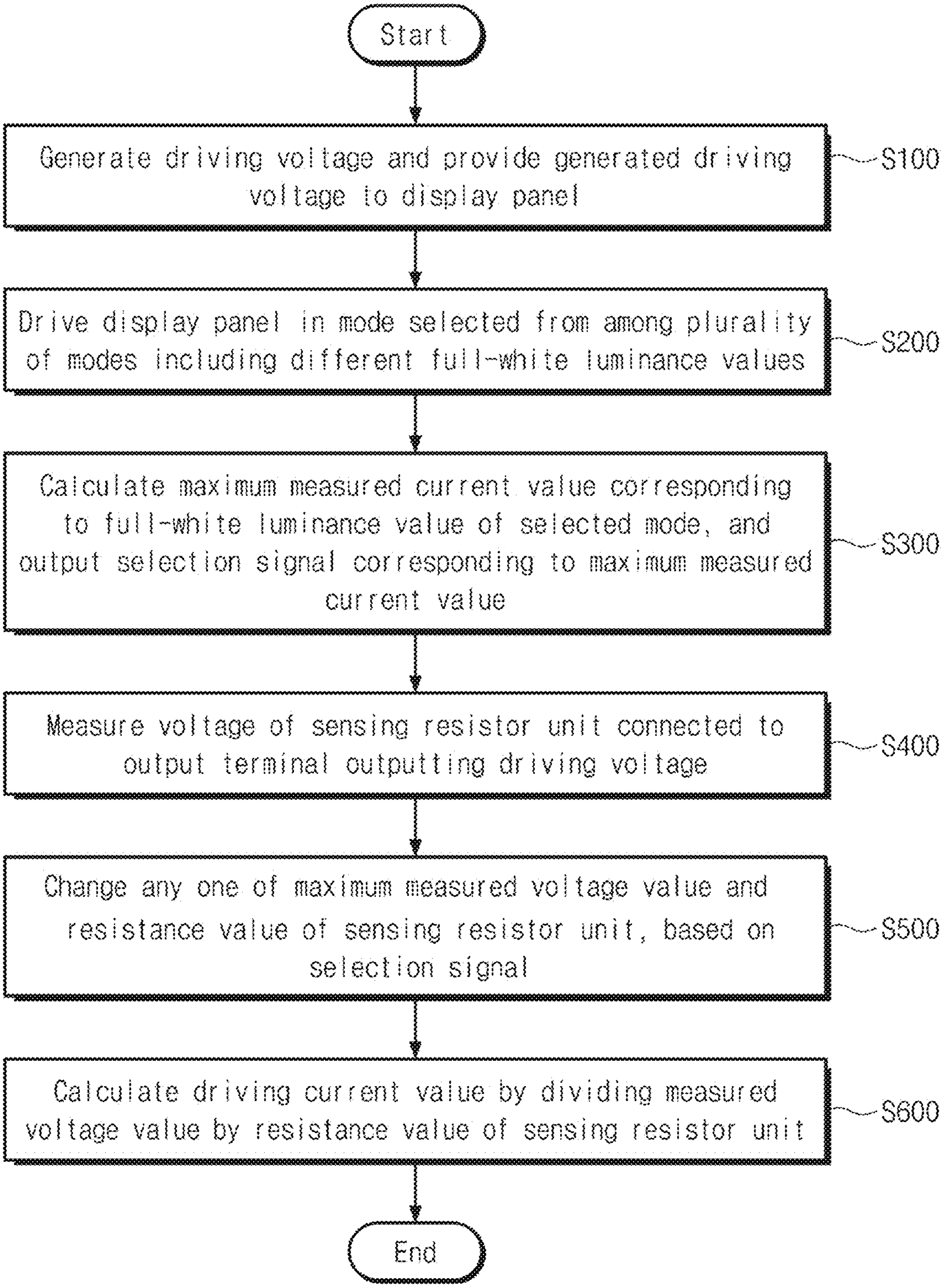
FIG. 15 is a flowchart for describing a method of driving a display device, according to an embodiment of the disclosure.

FIG. 15 is a flowchart for describing a method of driving a display device, according to an embodiment of the disclosure.

Since the detailed elements of the operations in FIG. 15 are the same as those described above, a key operation of the method will be briefly described with reference to FIG. 15.

Referring to FIG. 15, in operation S100, the driving voltage ELVDD may be generated and provided to the display panel DP. In operation S200, the display panel DP may be driven in a mode selected from among the plurality of modes MD1 to MD5 including different full-white luminance values F/W1 to F/W5. Although not illustrated in FIG. 15, the modes MD1 to MD5 may have different peak-white luminance values P/W1 to P/W5 from each other.

In operation S300, the maximum measured current value Imax corresponding to the full-white luminance value of the selected mode is calculated, and the selection signal SS corresponding to the maximum measured current value Imax may be output with M bits. Although not illustrated in FIG. 15, the maximum measured current value Imax may be calculated by further using the peak-white luminance value of the selected mode.

In operation S400, a voltage of the sensing resistor unit SR or SR' connected to the output terminal OT outputting the driving voltage ELVDD may be measured. In operation S500, any one of the maximum measured voltage value Vmax (or the reference voltage) and the resistance value Rv' of the sensing resistor unit SR' may be changed based on the selection signal SS. The operation of changing the maximum measured voltage value Vmax is the same as the operation described above with reference to FIGS. 10 and 11, and the operation of changing the resistance value Rv' is the same as the operation described with reference to FIGS. 13 and 14.

In operation S600, the driving current value Ic may be calculated by dividing the measured voltage value Vm by the resistance value Rv or Rv' of the sensing resistor unit SR or SR'.

In an embodiment of the disclosure, as the maximum measured voltage value Vmax, the maximum measured current value Imax, the resistance value Rv', and the current resolution are variously set depending on the first to fifth modes MD1 to MD5, the current measurement operation may be performed more accurately.

According to an embodiment of a method of driving a display device, a more accurate driving current value Ic may be sensed and may be provided to other circuit blocks. As various circuit blocks operating based on the sensing current operate in conjunction with the current measuring unit CM of the disclosure, the accuracy of the calculation algorithm of the circuit blocks may be improved.

In an embodiment, for example, when the temperature rises, a current value for driving the display panel may increase, and the display device may include a circuit block for adjusting the current value to a target current value. Since the current sensing operation is more precisely performed by the current measuring unit CM, the circuit block may more precisely calculate the current value as the target current value.

According to embodiments of a display device and a driving method thereof, as described herein, the display panel may be driven in the selected mode from among the plurality of modes including different full-white luminance values and different peak-white luminance values. The maximum measured current value corresponding to the full-white luminance value or the peak-white luminance value of the selected mode may be calculated.

In such embodiments, the maximum measured voltage may be set to a value corresponding to the maximum measured current value, or the resistance for measuring a voltage may be set to a value corresponding to the maximum measured current value. In such embodiments, the current resolution of the current sensing unit may be set to be optimized for the selected mode by variously setting the maximum measured voltage value or the resistance value depending on the modes.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel which is driven in a mode selected from among a plurality of modes including different luminance values, respectively;

a voltage generator which generates a driving voltage;

a resistor connected to an output terminal of the voltage generator from which the driving voltage is output;

a current sensing unit connected in parallel to the resistor, wherein the current sensing unit measures a voltage value across both ends of the resistor, and calculates a driving current value using a resistance value of the resistor and a measured voltage value; and a maximum current calculating unit which calculates a maximum measured current value corresponding to a luminance value of a selected mode, and outputs a selection signal corresponding to the maximum measured current value, and wherein the current sensing unit sets a maximum measured voltage value corresponding to the maximum measured current value in response to the selection signal.

2. The display device of claim 1, wherein the selection signal is output in M bits, wherein M is a natural number 2 or more.

3. The display device of claim 2, wherein as the luminance value of the selected mode increases, the maximum measured current value increases.

4. The display device of claim 3, wherein as the maximum measured current value increases, a value of the selection signal increases.

5. The display device of claim 3, wherein as a value of the selection signal increases, the maximum measured voltage value increases.

6. The display device of claim 1, wherein the current sensing unit calculates the driving current value by dividing the measured voltage value by the resistance value.

7. The display device of claim 1, wherein the current sensing unit has a current resolution defined as a value obtained by dividing the maximum measured current value by $2^N$, the current resolution is defined as a minimum unit current value of the driving current value, and N is a natural number 2 or more.

8. The display device of claim 7, wherein as the maximum measured current value increases, the minimum unit current value increases.

9. The display device of claim 1, wherein the current sensing unit includes:

a voltage measuring unit which measures the voltage value;

an analog-to-digital converter which receives the measured voltage value from the voltage measuring unit, sets the maximum measured voltage value to a maximum value in N bits, and outputs the measured voltage value in the N bits;

a reference voltage selector which selects one of a plurality of reference voltages as the maximum measured voltage value of the analog-to-digital converter in response to the selection signal; and a current calculating unit which calculates the driving current value by dividing the measured voltage value by the resistance value, wherein N is a natural number 2 or more.

10. The display device of claim 1, wherein the modes further include different peak-white luminance values, respectively, and wherein the maximum current calculating unit calculates the maximum measured current value by using a peak-white luminance value and the luminance value of the selected mode.

11. The display device of claim 10, further comprising:

a mode selector which selects one of the modes in response to a mode selection signal, and provides the luminance value and the peak-white luminance value of the selected mode to the maximum current calculating unit.

12. The display device of claim 1, wherein the resistance value is a fixed value.

13. A display device comprising:

a display panel which is driven in a mode selected from among a plurality of modes including different luminance values, respectively;

a voltage generator which generates a driving voltage;

a sensing resistor unit connected to an output terminal of the voltage generator from which the driving voltage is output, wherein a resistance value of the sensing resistor unit is variable;

a current sensing unit which measures a voltage value across both ends of the sensing resistor unit and calculates a driving current value using the resistance value and a measured voltage value; and a maximum current calculating unit which calculates a maximum measured current value corresponding to a luminance value of a selected mode, and outputs a selection signal corresponding to the maximum measured current value, and wherein the sensing resistor unit, in response to the selection signal, sets the resistance value thereof to a resistance value corresponding to the maximum measured current value.

14. The display device of claim 13, wherein the selection signal is output in M bits, as the luminance value of the selected mode increases, the maximum measured current value and a value of the selection signal increase, and M is a natural number 2 or more.

15. The display device of claim 14, wherein as the value of the selection signal increases, the resistance value decreases.

16. The display device of claim 15, wherein the sensing resistor unit includes:

a plurality of resistors connected in parallel to each other; and a plurality of switches, each connected between adjacent resistors among the resistors, wherein each of the switches controls a parallel connection between the adjacent resistors, and wherein the switches are turned-on or turned-off depending on the value of a corresponding bit among the M bits.

17. The display device of claim 13, wherein the current sensing unit calculates the driving current value by dividing the measured voltage value by the resistance value.

18. The display device of claim 13, wherein the current sensing unit includes:

a voltage measuring unit which measures the voltage value;

an analog-to-digital converter, a maximum measured voltage value of which is set, wherein the analog-to-digital converter receives the measured voltage value from the voltage measuring unit, sets the maximum measured voltage value to a maximum value in N bits, and outputs the measured voltage value in the N bits; and a current calculating unit which calculates the driving current value by dividing the measured voltage value by the resistance value, wherein N is a natural number 2 or more.

19. The display device of claim 18, wherein the maximum measured voltage value of analog-to-digital converter is a fixed value.

20. A method of operating a display device, the method comprising:

generating a driving voltage to provide the driving voltage to a display panel of the display device;

driving the display panel in a mode selected from among a plurality of modes including different luminance values, respectively;

calculating a maximum measured current value corresponding to a luminance value of a selected mode, and outputting a selection signal corresponding to the maximum measured current value;

measuring a voltage value across both ends of a sensing resistor unit connected to an output terminal from which the driving voltage is output;

changing one of a maximum measured voltage value and a resistance value of the sensing resistor unit, based on the selection signal; and calculating a driving current value by dividing a measured voltage value by the resistance value of the sensing resistor unit.

* * * * *